US012572692B2

(12) United States Patent
    Bohdan et al.

(10) Patent No.: US 12,572,692 B2
(45) Date of Patent: Mar. 10, 2026

(54) SYSTEM AND METHOD FOR PRIVACY-PRESERVING ARTIFICIAL INTELLIGENCE AND MACHINE LEARNING

(71) Applicant: Simpleway Technologies Ltd., Ballsbridge (IE)

(72) Inventors: Artem Bohdan, Berlin (DE); Ievgen Krutov, Kryvyi Rih (UA); Ramesh Rajaduray, Toronto (CA)

(73) Assignee: Simpleway Technologies Ltd., Ballsbridge (IE)

( * ) Notice: Subject to any disclaimer, the term of this patent is extended or adjusted under 35 U.S.C. 154(b) by 244 days.

(21) Appl. No.: 18/552,817

(22) PCT Filed: Mar. 28, 2022

(86) PCT No.: PCT/IB2022/052788
    § 371 (c)(1),
    (2) Date: Sep. 27, 2023

(87) PCT Pub. No.: WO2022/208273
    PCT Pub. Date: Oct. 6, 2022

(65) Prior Publication Data
    US 2024/0152648 A1     May 9, 2024

Related U.S. Application Data

(60) Provisional application No. 63/167,113, filed on Mar. 28, 2021.

(51) Int. Cl.
    *G06F 21/62*     (2013.01)
    *H04L 9/00*     (2022.01)
(52) U.S. Cl.
    CPC .......... *G06F 21/6245* (2013.01); *H04L 9/008* (2013.01)

(58) Field of Classification Search
    CPC ..... G06F 21/6245; G06F 21/62; H04L 9/008; G06N 20/00
    See application file for complete search history.

(56) References Cited

U.S. PATENT DOCUMENTS 6,532,538  B1     3/2003   Cronk et al.
8,626,951  B2     1/2014   Casey et al.
                    (Continued)

FOREIGN PATENT DOCUMENTS

CN        105159720 A     12/2015
EP          1808763 A1     7/2007
                    (Continued)

OTHER PUBLICATIONS

US 9,516,090 B2, 12/2016, Koo et al. (withdrawn)
                    (Continued)

*Primary Examiner* — Quazi Farooqui
(74) *Attorney, Agent, or Firm* — ICE MILLER LLP; Justin D. Swindells

(57) ABSTRACT

A system for privacy preserving artificial intelligence (AI) comprising: a first and second device interoperability system (DIS) coupled to an artificial intelligence analysis subsystem (AIAS). The first and second DIS receive a first and second plurality of data sets from coupled first and second pluralities of user devices respectively. The first and second DIS create first and second aggregated data sets based on the received first and second pluralities of data sets. The first and second DIS determine first and second subsets of model parameters for an AI model based on the first and second aggregated data sets; then transmit first and second sets of information based on the model parameter subsets to the AIAS. The AIAS creates a set of model parameters for the
                    (Continued)

AI model based on the transmitted sets of information, and transmits the set of model parameters to the first and second DIS for deployment.

20 Claims, 25 Drawing Sheets

(56)                    References Cited

U.S. PATENT DOCUMENTS

| | | | |
|---|---|---|---|
| 9,282,168 | B2 | 3/2016 | Prahlad |
| 9,450,874 | B2 | 9/2016 | Zhang et al. |
| 9,501,666 | B2 | 11/2016 | Lockett et al. |
| 10,180,846 | B2 | 1/2019 | Bohdan et al. |
| 11,977,961 | B2 * | 5/2024 | Ergen .................... G06F 9/5077 |
| 2005/0289510 | A1 | 12/2005 | Illowsky et al. |
| 2006/0150239 | A1 | 7/2006 | Fujimori et al. |
| 2007/0174404 | A1 | 7/2007 | Hui et al. |
| 2007/0174414 | A1 | 7/2007 | Song et al. |
| 2009/0019276 | A1 | 1/2009 | Song et al. |
| 2009/0019277 | A1 | 1/2009 | Song et al. |
| 2009/0216866 | A1 | 8/2009 | Lu et al. |
| 2009/0287915 | A1 | 11/2009 | Gattegno et al. |
| 2009/0300020 | A1 | 12/2009 | Chen et al. |
| 2012/0084481 | A1 | 4/2012 | Reeves et al. |
| 2012/0272095 | A1 | 10/2012 | Liu et al. |
| 2013/0117502 | A1 | 5/2013 | Son et al. |
| 2013/0144939 | A1 | 6/2013 | Prahlad |
| 2014/0036767 | A1 | 2/2014 | Perugupalli et al. |
| 2014/0089526 | A1 | 3/2014 | Schmidt |
| 2014/0191579 | A1 | 7/2014 | Szu |
| 2014/0317242 | A1 | 10/2014 | Koo et al. |
| 2016/0142891 | A1 | 5/2016 | Mrhia |
| 2016/0156682 | A1 | 6/2016 | Jeon et al. |
| 2017/0339251 | A1 | 11/2017 | Jagannath et al. |
| 2018/0102916 | A1 | 4/2018 | Chen et al. |
| 2022/0027780 | A1 * | 1/2022 | Butvinik .............. G06N 3/0464 |

FOREIGN PATENT DOCUMENTS

| | | | |
|---|---|---|---|
| EP | 2750033 | A1 | 7/2014 |
| EP | 2753047 | A1 | 7/2014 |
| EP | 3040869 | A1 | 7/2016 |
| EP | 3485436 | A1 | 5/2019 |
| JP | 2005174002 | A | 6/2005 |
| JP | 2006099234 | A | 4/2006 |
| JP | 2007-525756 | A | 9/2007 |
| JP | 4909332 | B2 | 4/2010 |
| JP | 5295341 | B2 | 4/2012 |
| JP | 2012172666 | A | 9/2012 |
| JP | 2014135881 | A | 7/2014 |
| WO | 2010063985 | A1 | 6/2010 |
| WO | 2014210172 | A2 | 12/2014 |
| WO | 2018078495 | A1 | 5/2018 |

OTHER PUBLICATIONS

Konečný, J, et al., "Federated Learning: Strategies for Improving Communication Efficiency", arXiv preprint, Oct. 30, 2017, pp. 1-10, arXiv:1610.05492.

McMahan, H.B., et al., "Communication-Efficient Learning of Deep Networks from Decentralized Data", Proceedings of the 20th International Conference on Artificial Intelligence and Statistics, Apr. 10, 2017, pp. 1273-1282, JMLR.

Bonawitz, K., et al., "Practical secure aggregation for privacy-preserving machine learning", Proceedings of the 2017 ACM SIGSAC Conference on Computer and Communications Security, Oct. 30, 2017, pp. 1175-1191.

"TensorFlow: Federated Learning", <https://www.tensorflow.org/federated/federated_learning?hl=en>, Mar. 23, 2021, 8 pages.

Ryffel, T., et al., "A generic framework for privacy preserving deep learning", arXiv preprint, Nov. 13, 2018, arXiv:1811.04017, 5 pages.

"Overview—Fate" (FedAI Ecosystem: About), <https://www.fedai.org/about/>, Mar. 23, 2021, 2 pages.

International Search Report of the ISA/EP for PCT/IB2022/052788, Jun. 28, 2022, 4 pages.

Wikipedia, "Federated learning", <https://en.wikipedia.org/wiki/Federated_learning>, Jun. 15, 2022, 11 pages.

Liu, L., et al., "Client-Edge-Cloud Hierarchical Federated Learning", ICC 2020-2020 IEEE International Conference on Communications, Jun. 7, 2020, pp. 1-6, IEEE.

Zhou, Z., et al., "CEFL: Online Admission Control, Data Scheduling, and Accuracy Tuning for Cost-Efficient Federated Learning Across Edge Nodes", IEEE Internet of Things Journal, Oct. 2020, 7:10 pp. 9341-9356, IEEE.

Caceres, R., et al., "Reincarnating PCs with Portable SoulPads", Proceedings of the 3rd International Conference on Mobile Systems, Applications, and Services, 2005, pp. 65-78.

Wikipedia, "Booting", <https://en.wikipedia.org/wiki/Booting>, Jun. 2, 2021, retrieved Sep. 21, 2022, 20 pages.

Wikipedia, "Live USB", <https://en.wikipedia.org/wiki/Live_USB>, May 19, 2021, retrieved Sep. 21, 2022, 6 pages.

International Search Report of the ISA/EP for PCT/IB2022/055501, Sep. 30, 2022, 4 pages.

Written Opinion of the ISA/EP for PCT/IB2022/055501, Sep. 30, 2022, 9 pages.

English translation of the third Office Action for Chinese Patent Application No. 201780064681X, Oct. 11, 2023, 3 pages.

Second Office Action for Chinese Patent Application No. 201780064681X, with partial English translation, Apr. 7, 2023, 9 pages.

Second Office Action for Chinese Patent Application No. 201780064681X, English translation of Examiner's comments, Apr. 7, 2023, 9 pages.

First Office Action for Chinese Patent Application No. 201780064681X, with partial English translation, Aug. 27, 2022, 10 pages.

First Office Action for Chinese Patent Application No. 201780064681X, English translation of Examiner's Comments, Aug. 27, 2022, 7 pages.

Examination Report for European Patent Application 17805258.5, Oct. 14, 2021, 10 pages.

Summons to Attend Oral Proceedings for European Patent Application 17805258.5, Jun. 13, 2023, 13 pages.

Preliminary Opinion before the Oral Proceedings for European Patent Application 17805258.5, Nov. 3, 2023, 9 pages.

Wikipedia, "SoulPad", <https://en.wikipedia.org/wiki/SoulPad>, May 15, 2016, 3 pages.

Singer, M., "IBM brains capture a PC's soul", CNET.com, Aug. 12, 2005, 3 pages.

Raghunath, M, et al., "Reincarnating PCs with Portable SoulPads", IBM Research Report, Nov. 8, 2004, 15 pages.

Knight, W., "Pocket-sized computer 'soul' developed", New Scientist, Aug. 10, 2005, 2 pages.

English translation of Office Action in Japanese Patent Application No. 2019-546110, Oct. 29, 2021, 5 pages.

"Using Google Drive—New Features, Benefits & Advantages of Google Cloud Storage", <https://www.google.com/intl/en_US/drive/using-drive/>, retrieved Dec. 16, 2019, 4 pages.

Dropbox, "Focus on the work that matters", <https://www.dropbox.com/>, retrieved Dec. 16, 2019, 6 pages.

ICloud—Apple, "The best place for all your photos, files and more", <https://www.apple.com/ca/icloud/>, retrieved Dec. 16, 2019, 15 pages.

Resilio Connect File Sync Software, "Connecting Massive Data Flows" <https://www.resilio.com/>, retrieved Dec. 16, 2019, 9 pages.

Librevault, "File synchronization designed with privacy in mind", <https://librevault.com/>, retrieved Dec. 16, 2019, 2 pages.

Tonido, "Run Your Personal Cloud. A Free Private Cloud Server", <https://www.tonido.com/>, retrieved Dec. 16, 2019, 5 pages.

ASUS USA, "ASUS PadFone X (US)", <https://www.asus.com/us/Phone/ASUS_PadFone_X_US/>, retrieved Dec. 16, 2019, 6 pages.

HP Canada, "HP Elite x3: The one device that's every device", <https://www8.hp.com/ca/en/ads/elitex3/overview.html>, retrieved Dec. 16, 2019, 10 pages.

(56) References Cited

OTHER PUBLICATIONS

Fuchsia, "Fuchsia is not Linux", <https://fuchsia.dev/fuchsia-src/concepts>, retrieved Dec. 16, 2019, 4 pages.

RSA, "RSA Data Privacy & Security Survey 2019: The Growing Data Disconnect", <https://www.rsa.com/content/dam/en/misc/rsa-data-privacy-and-security-survey-2019.pdf>, 2019, 16 pages.

Samsung Global Newsroom, "Samsung Raises the Bar with Galaxy S10: More Screen, Cameras and Choices", <https://news.samsung.com/global/samsung-raises-the-bar-with-galaxy-s10-more-screen-cameras-and-choices>, Feb. 21, 2019, 14 pages.

Zion, "Zion Exodus", <https://www.htcexodus.com/eu/zion/>, retrieved Dec. 16, 2019, 3 pages.

Sirin Labs, "Uncompromised Security in a Blockchain Smart-phone", <https://shop.sirinlabs.com/>, retrieved Dec. 16, 2019, 7 pages.

VaultTel, "Your devices safe and sound Like a Vault", <https://vaulttel.net/>, 2018, retrieved Dec. 16, 2019, 2 pages.

Librevault, "Librevault features overview", <https://librevault.com/blog/features/>, May 22, 2016, 2 pages.

International Search Report and Written Opinion of ISA/EP for PCT/IB2017/056516, Feb. 9, 2018, 11 pages.

English translation of Notice of Preliminary Rejection in Korean Patent Application No. KR 10-2019-7105081, May 23, 2022, 6 pages.

Written Opinion of the ISA/EP for PCT/IB2022/052788, Jun. 28, 2022, 9 pages.

* cited by examiner

FIG. 1

USER DEVICE 101-1

USER DEVICE 101-N

USER 100

USER DEVICE 101-2

USER DEVICE 101-3

FIG. 2

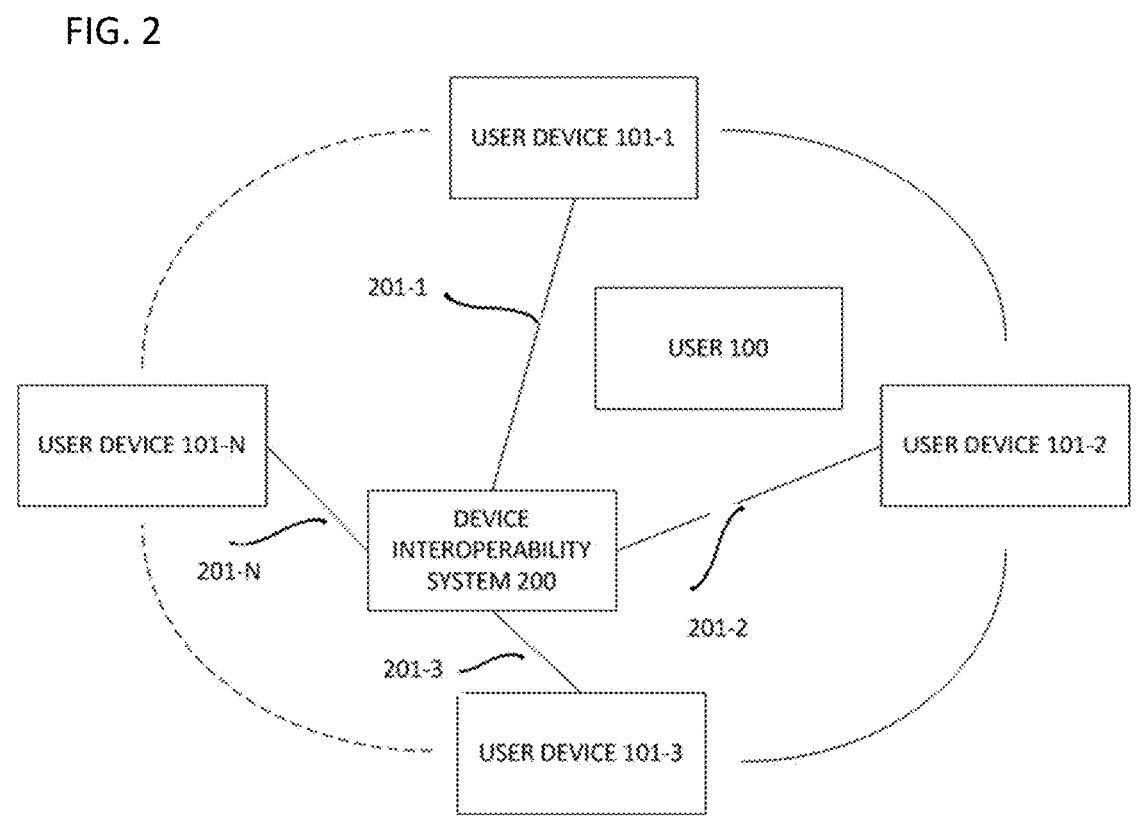

USER DEVICE 101-1

201-1

USER 100

USER DEVICE 101-N

201-N

DEVICE INTEROPERABILITY SYSTEM 200

USER DEVICE 101-2

201-2

201-3

USER DEVICE 101-3

STORAGE 212

510-1

510-2

510-3

510-4

HIERARCHY
600

908-1               908-2                  907-1

1008-1         1008-2         1002-1

SYSTEM AND METHOD FOR PRIVACY-PRESERVING ARTIFICIAL INTELLIGENCE AND MACHINE LEARNING

FIELD OF THE INVENTION

The present disclosure relates to decentralized artificial intelligence and machine learning, specifically privacy preserving artificial intelligence and machine learning.

SUMMARY

A system for privacy preserving artificial intelligence (AI) or machine learning (ML) comprising: a first device interoperability system coupled to a first plurality of user devices via a first plurality of connections, and a second device interoperability system coupled to a second plurality of user devices via a second plurality of connections; further wherein the first device interoperability system receives a first plurality of data sets from the first plurality of user devices via the first plurality of connections, the second device interoperability system receives a second plurality of data sets from the second plurality of user devices via the second plurality of connections, the first device interoperability system creates a first aggregated data set based on the received first plurality of data sets, the second device interoperability system creates a second aggregated data set based on the received second plurality of data sets, the first device interoperability system determines a first subset of model parameters for an AI or ML model based on the first aggregated data set, the second device interoperability system determines a second subset of model parameters for the AI or ML model based on the second aggregated data set, the first device interoperability system transmits a first set of information based on the first subset of model parameters to the artificial intelligence analysis subsystem, the second device interoperability system transmits a second set of information based on the second subset of model parameters to the artificial intelligence analysis subsystem, the artificial intelligence analysis subsystem creates a set of model parameters associated with the AI or ML model based on the transmitted first and second sets of information, the artificial intelligence analysis subsystem transmits the set of model parameters to the first and second device interoperability systems, and at least one of the first and second device interoperability systems deploy the AI or ML model based on the set of model parameters.

A method for privacy preserving artificial intelligence (AI) or machine learning (ML) comprising: providing one or more device interoperability systems coupled to an artificial intelligence analysis subsystem via one or more interconnections, wherein the one or more device interoperability systems comprise a first device interoperability system coupled to a first plurality of user devices via a first plurality of connections, and a second device interoperability system coupled to a second plurality of user devices via a second plurality of connections; further wherein the first device interoperability system receives a first plurality of data sets from the first plurality of user devices via the first plurality of connections, the second device interoperability system receives a second plurality of data sets from the second plurality of user devices via the second plurality of connections, the first device interoperability system creates a first aggregated data set based on the received first plurality of data sets, the second device interoperability system creates a second aggregated data set based on the received first plurality of data sets, the first device interoperability system determines a first subset of model parameters for an AI or ML model based on the first aggregated data set, the second device interoperability system determines a second subset of model parameters for the AI or ML model based on the second aggregated data set, the first device interoperability system transmits a first set of information based on the first subset of model parameters to the artificial intelligence analysis subsystem, the second device interoperability system transmits a second set of information based on the second subset of model parameters to the artificial intelligence analysis subsystem, the artificial intelligence analysis subsystem creates a set of model parameters associated with the AI or ML model based on the transmitted first and second sets of information, the artificial intelligence analysis subsystem transmits the set of model parameters to the first and second device interoperability systems, and at least one of the first and second device interoperability systems deploy the AI or ML model based on the set of model parameters.

A method for privacy preserving artificial intelligence (AI) or machine learning (ML) comprising: providing one or more device interoperability systems coupled to an artificial intelligence analysis subsystem via one or more interconnections, wherein the one or more device interoperability systems comprise a first device interoperability system coupled to a first plurality of user devices via a first plurality of connections, and a second device interoperability system coupled to a second plurality of user devices via a second plurality of connections; receiving, at the first device interoperability system, a first plurality of data sets from the first plurality of user devices via the first plurality of connections; receiving, at the second device interoperability system, a second plurality of data sets from the second plurality of user devices via the second plurality of connections; creating, using the first device interoperability system, a first aggregated data set based on the received first plurality of data sets; creating, using the second device interoperability system, a second aggregated data set based on the received second plurality of data sets; determining, using the first device interoperability system, a first subset of model parameters for an AI or ML model based on the first aggregated data set; determining, using the second device interoperability system, a second subset of model parameters for the AI or ML model based on the second aggregated data set; transmitting, from the first device interoperability system, a first set of information created based on the first subset of model parameters to the artificial intelligence analysis subsystem; transmitting, from the second device interoperability system, a second set of information created based on the second subset of model parameters to the artifical intelligence analysis subsystem; creating, at the artificial intelligence analysis subsystem, a set of model parameters associated with the AI or ML model based on the transmitted first and second sets of information; transmitting, from the artificial intelligence analysis subsystem, the set of model parameters to the first and second device interoperability systems; and deploying the AI or ML model at one or more of the first and second device interoperability systems based on the set of model parameters.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 1 illustrates a situation for a user with one or more user devices.

FIG. 2 illustrates an example of a device interoperability system working in conjunction with the user devices.

Figure 2B:
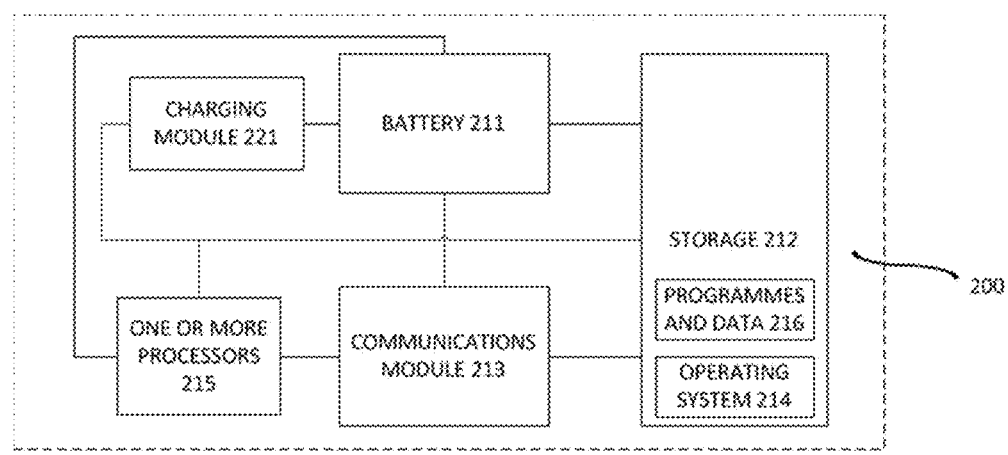
FIG. 2B illustrates an example architecture for the device interoperability system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The number of devices owned or operated by a person has grown tremendously. Typically, a person has a plurality of computing devices, such as:

Smartphones,
Tablets,
Desktops,
Laptops,
Game consoles,
Smart watches/bands, and
Smart glasses.

In addition, many other devices and items have become "smart", that is, their computing capabilities and processing power have increased, and they have been network enabled. These include, for example:

Vehicles such as cars and trucks,
Television (TV) sets,
Kitchen appliances such as refrigerators and microwave ovens,
Cameras,
Fitness devices such as FITBIT®,
Medical devices such as blood pressure monitors and heart rate monitors,
Air-conditioning systems, and
Smart home systems.

Furthermore the "Internet of Things" (IoT) has also grown tremendously. The IoT refers to networks of consumer and industrial devices interconnected with each other and with other computing devices.

All of this means that the number of devices which have computing and network capability, and are associated with a particular user, is growing rapidly.

Figure 1:
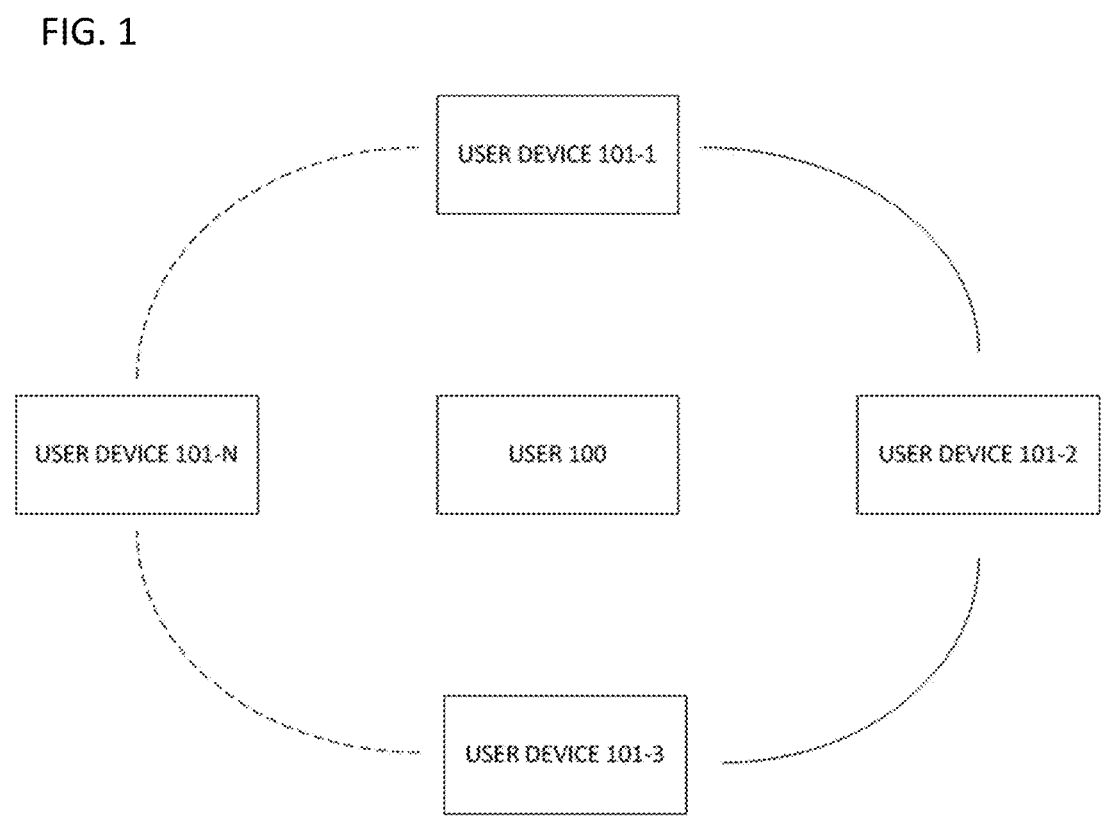

FIG. 1 illustrates this situation. In FIG. 1, user devices 101-1 to 101-N comprise the devices associated with user 100. These include, for example, the electronic computing devices and the other devices and items mentioned above.

Given the situation shown in FIG. 1, users such as user 100 face many different challenges. Firstly, documents and data from different devices need to be synchronized with each other. Typically, this is performed using, for example:

Portable data storage devices such as Universal Serial Bus (USB) flash drives, and removable hard drives, and
Network or "cloud"-based techniques.

These techniques of document and data synchronization have deficiencies. Cloud connectivity may not always be present. When it is, connectivity may be intermittent or slow. Privacy may also be an issue with cloud-based techniques.

Secondly, synchronization may be imperfect or incomplete due to each computing device and consumer item running different operating systems (OSes) and different platforms. Referring to FIG. 1, user device 101-1 to 101-N have their own processing and memory capabilities and may run different OSes, platforms and software. As a consequence the user is forced to get used to different environments on different devices and also to repeat the same tasks for several devices, for example, installing applications, customizing settings or performing service tasks like software updates or antivirus scanning. Compatibility may also be an issue. As an example, if user 100 edits a file first with user device 101-1 and then with user device 101-2, that file may end up being corrupted as a result due to the different versions of the editing software installed on user device 101-1 and 101-2.

It is therefore necessary to address these deficiencies in device synchronization in order to ensure continued growth and adoption of "smart" technology; and interoperability of these user devices.

The remainder of this specification details a system and a method for device interoperability to address the above problems. An example architecture of such a device interoperability system 200 is shown in FIGS. 2 and 2B. In FIG. 2, one or more connections 201-1, 201-2, 201-3 to 201-N between device interoperability system 200 and one or more user devices 101-1, 101-2, 101-3 to 101-N are established as needed. In one embodiment, the one or more user devices 101-1, 101-2, 101-3 to 101-N initiate the establishment of the connection. In another embodiment, the device interoperability system 200 initiates the establishment of the connection.

Device interoperability system 200 comprises several components necessary for its functioning. An illustration of one embodiment of device interoperability system 200 is shown in FIG. 2B. As shown in FIG. 2B, device interoperability system 200 comprises battery 211, battery charging module 221, storage 212, one or more processors 215 and communications module 213.

The one or more processors 215 perform the functions of supporting the other elements of device interoperability system 200. This includes, for example:

maintaining interconnection between the elements of device interoperability system 200, maintaining overall security of device interoperability system 200, and service functions necessary for the operation of device interoperability system 200.

Communications module 213 participates in the establishment of the one or more connections 201-1 to 201-N. Communications module 213 also works to maintain the one or more connections 201-1 to 201-N to the one or more user devices 101-1 to 101-N. Communications module 213 also works to perform operations necessary to secure connections 201-1 to 201-N. These include, for example, encryption and access operations. In one embodiment, communications module 213 also manages and optimizes power consumption related to one or more connections 201-1 to 201-N. For example, communications module 213 adjusts the transmission powers used for the one or more connections 201-1 to 201-N based on distances from user devices such as user device 101-1.

Battery 211 supplies power for the operation of device interoperability system 200. Charging module 221 enables charging of battery 211 using an external power source. In one embodiment, charging module 221 enables wireless charging.

As shown in FIG. 2B, storage 212 is coupled to communications module 213 and is used to store OS 214, programmes and data 216 which are necessary for the functioning of device interoperability system 200. For example, user preferences, applications and user documents and data may also be stored on storage 212. The functioning of OS 214 will be discussed in detail below. In one embodiment, storage 212 is built using energy-efficient storage technology such as SSD (Solid State Drive) or embedded Multimedia Controller (eMMC) flash memory technology. In one embodiment, the information stored in storage 212 is encrypted. This reduces the risk of a malicious party obtaining access to the stored information. In one embodiment, the Advanced Encryption Standard (AES) is used for encryption.

Referring to FIGS. 2 and 2B, connection 201-1 between device interoperability system 200 and user device 101-1 is established before the native user device 101-1 OS loads. Once connection 201-1 is established with user device 101-1, OS 214 boots and runs from storage 212 on user device 101-1. Then, user device 101-1 is able to access data and program code stored on storage 212 as required. The program code of OS 214 and installed applications is run on the user device which device interoperability system 200 is connected to, and uses the processing capabilities of this user device for its operation. For example, referring to FIG. 2, if device interoperability system 200 is connected to user device 101-1, then the program code is run on user device 101-1 using the processing power and memory of user device 101-1 as needed. The establishment of connection 201-1 and subsequent booting of OS 214 is performed in a variety of ways, as will be detailed below.

In one embodiment, at least one of the connections 201-1 to 201-N is a direct connection. This direct connection can be, for example, a direct wireless connection.

In some embodiments, user device 101-1 comprises firmware that provides the ability to support booting from device interoperability system 200 via a direct wireless connection. For example, in one embodiment, user device 101-1 comprises a Basic Input Output System (BIOS) or Unified Extensible Firmware Interface (UEFI) which supports the Media Agnostic USB specification. This allows the user device 101-1 to use the USB protocol over the direct wireless connection to facilitate the booting of OS 214 on the user device 101-1 and data transfer between device interoperability system 200 and user device 101-1.

In some embodiments, user device 101-1 does not comprise firmware that provides the ability to support booting from device interoperability system 200 via a direct wireless connection. Then it is necessary to use an intermediary. For example, in one embodiment, the device interoperability system 200 is coupled wirelessly to a miniature USB dongle plugged into a USB port on user device 101-1. Then the miniature USB dongle will simulate a USB flash drive connected to user device 101-1. Then when user device 101-1 is switched on, the direct wireless connection is established between the miniature USB dongle and device interoperability system 200. Then OS 214 is booted on the user device 101-1 from the storage 212 as though it is an ordinary USB flash drive connected to the USB port. In one embodiment, the user must change the BIOS or UEFI settings for user device 101-1 so that user device 101-1 will boot from the device interoperability system 200.

In another embodiment, the direct connection is a direct wired connection. In a further embodiment, the at least one direct wired connection includes, for example, a USB connection. In further embodiments, the direct wired connection is a connection facilitated via docking. In yet another embodiment, at least one of the connections 201-1 to 201-N are direct wireless and at least one of the connections 201-1 to 201-N are direct wired.

When connection 201-1 between user device 101-1 and device interoperability system 200 is facilitated via docking, further embodiments are also possible. In one embodiment, both the device where device interoperability system 200 is installed, and user device 101-1 have direct docking capabilities including, for example, docking ports. Then, device interoperability system 200 interacts with the user device 101-1 via these direct docking capabilities. In yet another embodiment, the device where device interoperability system 200 is installed is coupled to a docking station which is connected to user device 101-1. In a further embodiment, when the docking station is connected to user device 101-1 by, for example, USB cable, the user device 101-1 will recognize the docking station with the device where device interoperability system 200 is installed as a connected external USB drive. In one embodiment, the user must change the BIOS or UEFI settings for user device 101-1 so that user device 101-1 will boot from the USB connected device. In a further embodiment, the docking station provides charging for the device where device interoperability system 200 is installed.

While the above describes situations where connections 201-1 to 201-N are direct connections between two devices, one of skill in the art would know that it is possible to use indirect connections as well. In another embodiment, at least one of the connections 201-1 to 201-N are indirect connections. These indirect connections include, for example, one or more of:

connections facilitated via a Local Area Network (LAN), or connections facilitated via a cloud-based service.

In a further embodiment, when at least two of the described above types of connection are available, the choice between connection types is performed automatically for at least one of the connections 201-1 to 201-N. In one embodiment, the choice is based on the following factors:

connection speed, connection latency, data transmission costs, and user preferences.

In a further embodiment, when the connectivity is lost, either a different type of direct or indirect connection is automatically selected.

In a further embodiment, the at least one connection is secured. The securing is performed by, for example:

Encryption using techniques such as Wi-Fi Protected Access (WPA2), and

Requiring access authentication on both endpoints of a connection when the connection is first established. This is performed using, for example passwords and techniques such as near field communication (NFC) or Wi-Fi Protected Setup (WPS)-like algorithms.

In embodiments where the at least one connection is secured, before establishing the connection authentication is performed at the end points, that is, between device interoperability system 200 and user device 101-1.

Figure 2C:
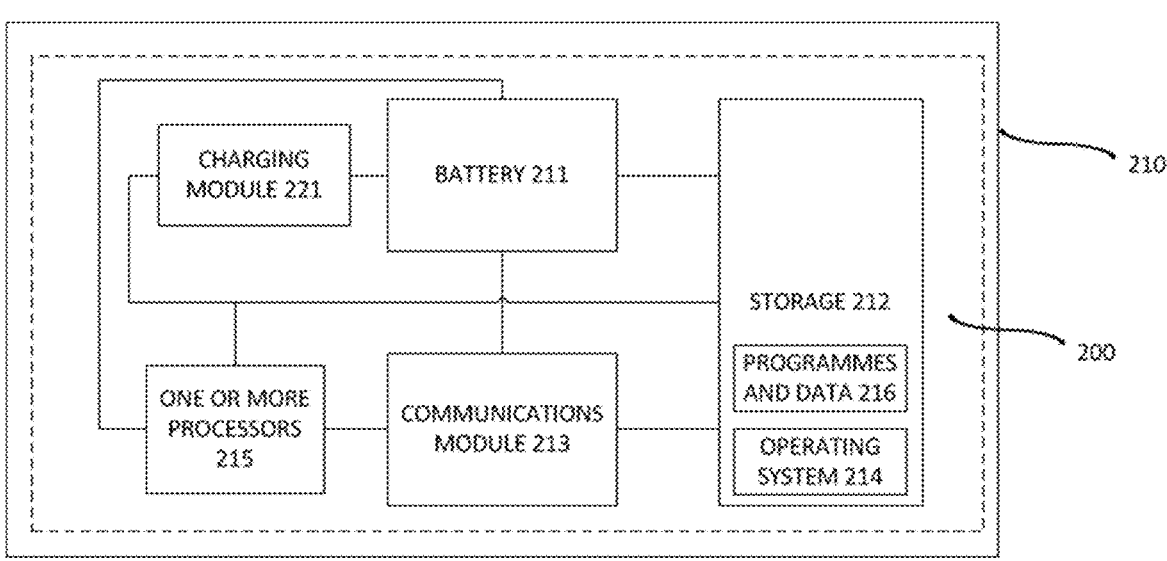
FIG. 2C illustrates an example of a gadget to run the device interoperability system.

Device interoperability system 200 can be implemented in a variety of ways. In one embodiment, device interoperability system 200 is implemented using a separate gadget, such as gadget 210 as shown in FIG. 2C. Then, the one or more connections 201-1 to 201-N are established with gadget 210.

Figure 2D:
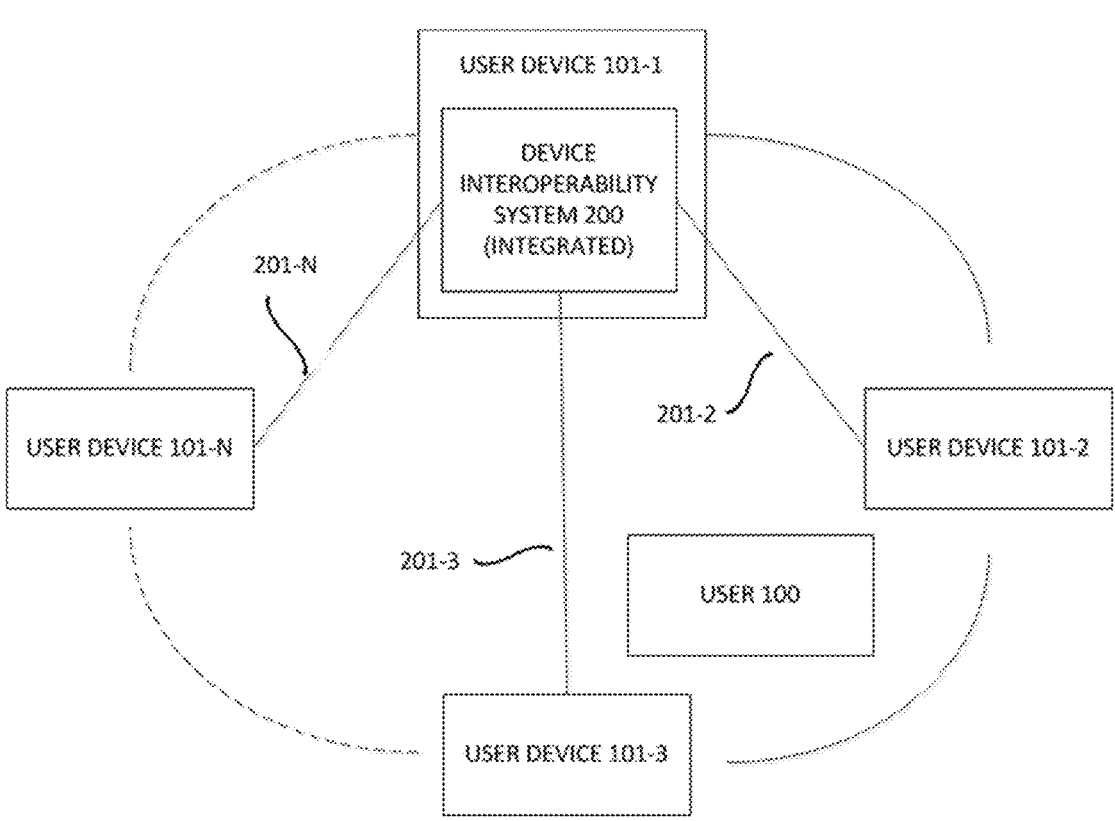
FIG. 2D shows an example where the device interoperability system is integrated into a user device.

In another embodiment, device interoperability system 200 is installed via integration into one of user devices 101-1 to 101-N. For example, as shown in FIG. 2D, device interoperability system 200 is integrated into user device 101-1. This is achieved by, for example, implementing device interoperability system 200 as a firmware module of user device 101-1. Then, device interoperability system 200 uses one or more of the battery, storage, communications module, processors and other capabilities of user device 101-1 in a similar fashion to the above-described use of battery 211, storage 212, one or more processors 215 and communications module 213 for its operation. OS 214 is stored within the storage of user device 101-1. Then the user device 101-1 runs OS 214 instead of its native OS. When, as shown in FIG. 2D, at least one of connections 201-2 to 201-N are established between user device 101-1 and at least one of the other devices 101-2 to 101-N, device interoperability system 200 enables the connected user device to:

boot OS 214 which is stored in the storage of user device 101-1, and use programmes and data 216 which are stored in the storage of user device 101-1.

In a further embodiment, some hardware components of the user device 101-1 with integrated device interoperability system 200 are recognized and used by the OS 214 as connected external devices, when OS 214 runs on a different device which is connected to user device 101-1. For example, in the case where user device 101-1 is a smartphone: When OS 214 runs on user device 101-2 which is connected to user device 101-1, the hardware components of user device 101-1 such as the microphone, sensors, mobile telecommunications module and display are used by OS 214 as external devices.

Figure 2E:
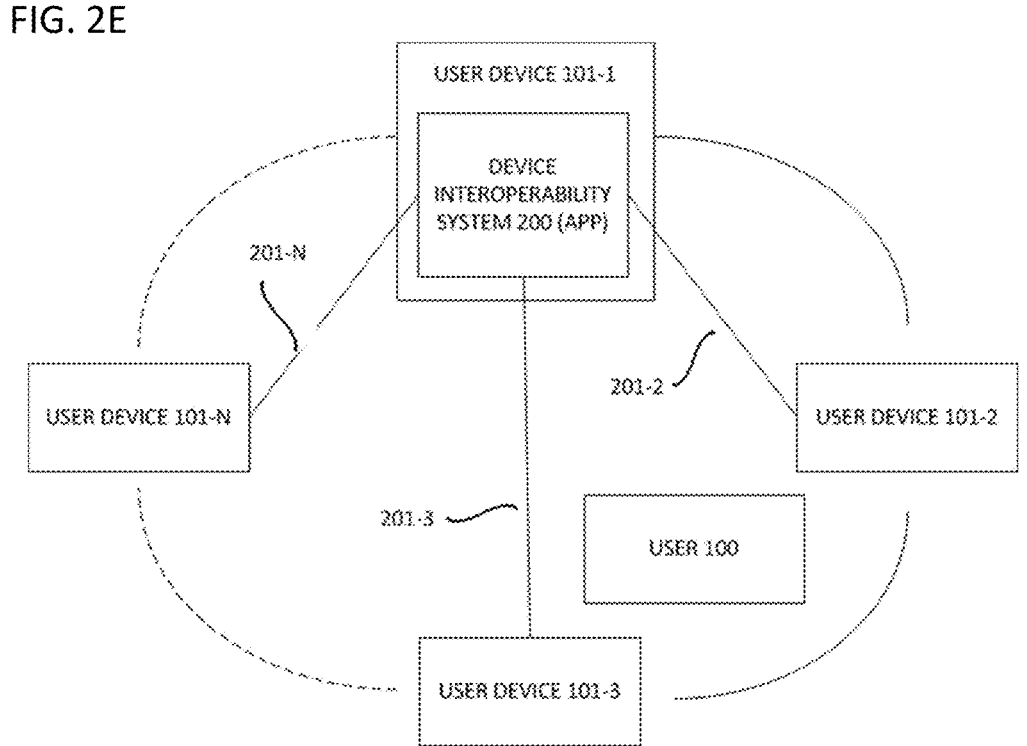
FIG. 2E shows an example where the device interoperability system runs as an application on a user device.

In yet another embodiment, device interoperability system 200 is implemented as an installed application or an "app" which runs on one of user devices 101-1 to 101-N, for example user device 101-1. For example, as shown in FIG. 2E, device interoperability system 200 runs as an app on user device 101-1. Then device interoperability system 200 uses one or more of the battery, storage, communications module, processors and other capabilities of user device 101-1 for its operation, similar to the integrated case described above and in FIG. 2D. Similar to as described above, when a connection is established with a user device, device interoperability system 200 gives the connected user device the ability to boot OS 214 which is stored in the storage of user device 101-1. In another embodiment, in case the app is not able to provide the required level of access to data stored on storage 212 of user device 101-1 which is used to boot OS 214 on user device 101-2, the interoperability system 200 also includes a separate image of:

either a copy of the OS 214, or some of its components.

This image is used on its own or in conjunction with user device 101-1 OS's components stored on storage of user device 101-1 to boot the OS on user device 101-2. Similar to the cases described above, in a further embodiment, some hardware components of the user device 101-1 are recognized and used by the OS 214 as connected external devices, when OS 214 runs on a different device which is connected to user device 101-1.

In some of the embodiments where device interoperability system 200 is installed via integration into user device 101-1 or as an app on user device 101-1, as part of communications module 213, an external wireless adapter is added to user device 101-1 to provide additional communications capabilities not available on user device 101-1, so as to improve performance and/or energy efficiency. This external wireless adapter works with, for example, an integrated controller which is already present on user device 101-1. Then, the communications module 213 comprises the integrated controller and the external wireless adapter of user device 101-1. For example, a USB wireless adapter based on WiGig or Li-Fi communication technology is plugged into a USB port of user device 101-1. This plugged in wireless adapter will interact with an integrated USB controller already present on user device 101-1. Then, the communications module 213 comprises this integrated USB controller and plugged in USB wireless adapter. These added components provide additional communication technology which is not initially available on user device 101-1 to improve performance and/or energy efficiency.

An example of the operation of device interoperability system 200 will be detailed below with reference to a user device, specifically user device 101-1. The descriptions below are applicable to a variety of situations including, for example:

device interoperability system 200 installed on a gadget such as gadget 210;

device interoperability system 200 is installed via integration into one of user devices different from user device 101-1, for example user devices 101-2 to 101-N; and device interoperability system 200 is installed as an app on one of user devices different from user device 101-1, for example user devices 101-2 to 101-N.

Additionally, there is a need to determine if user device 101-1 will operate in either "stand-alone" or "device interoperability system" mode. In stand-alone mode, the user device 101-1 runs its native OS. In interoperability system mode, the user device 101-1 is connected to device interoperability system 200 and runs OS 214. In a further embodiment, the user device 101-1 is switchable between stand-alone and interoperability system modes.

Figure 3:
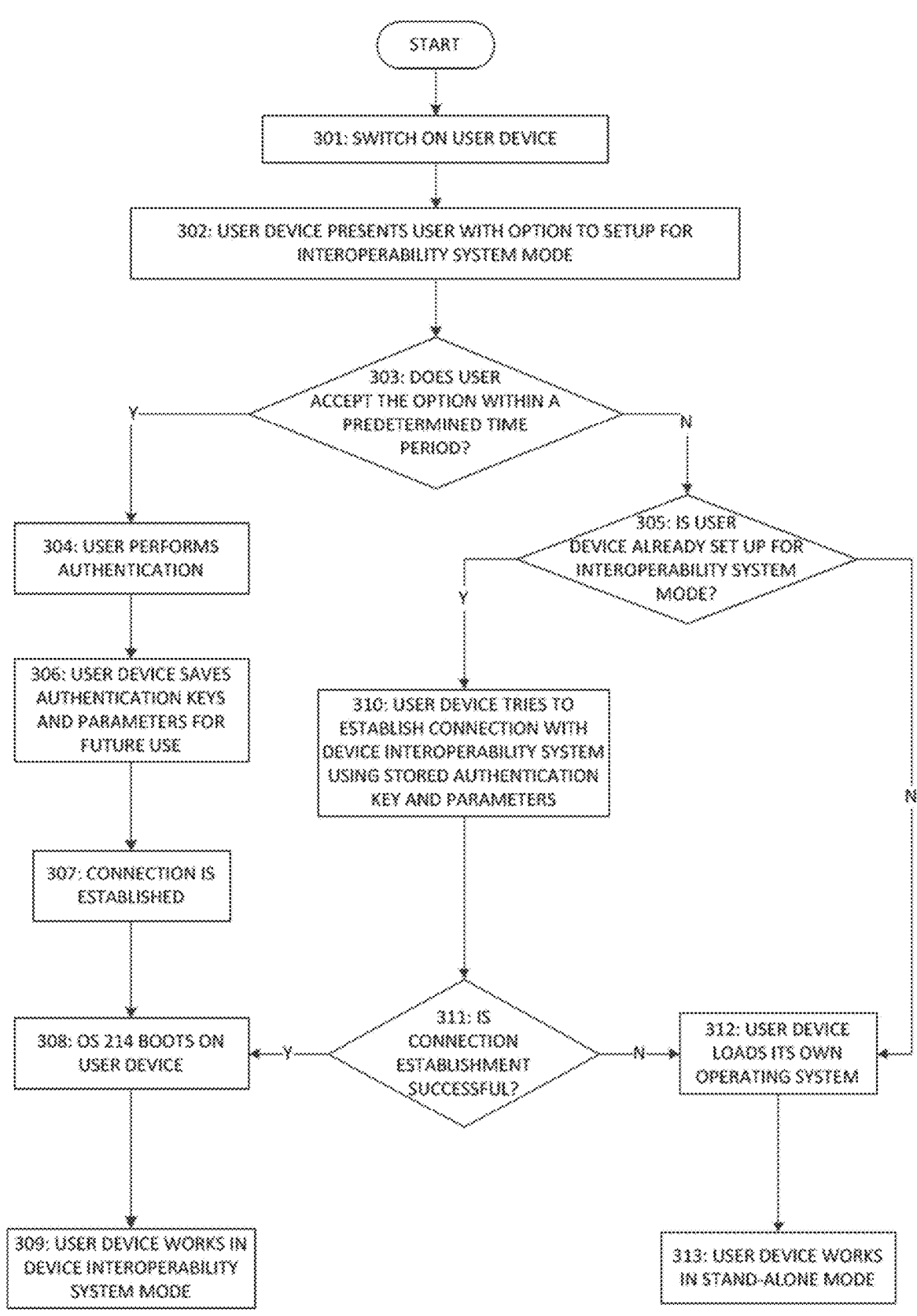
FIG. 3 shows an example algorithm for user device switchability between "stand-alone" and "interoperability system" modes.

An example algorithm for switching between stand-alone and interoperability system modes comprising:

establishment of connection 201-1 in the embodiments where connection 201-1 is a secured connection, and subsequent booting of the appropriate OS depending on whether stand-alone or interoperability modes is used, is provided in FIG. 3.

In FIG. 3, in step 301, user device 101-1 is switched on. In step 302, prior to establishing connection 201-1, user device 101-1 presents the user with the option of setting up for interoperability system mode.

If the user accepts the option of setting up for interoperability system mode within a predetermined period in step 303, then in step 304 the user performs authentication. In one embodiment, in step 304 the user enters a unique string, password or passphrase specific to the device interoperability system 200. In another embodiment, in step 304 the user enters a login name and a password specific to the OS 214. In yet another embodiment, the user uses login details from another social media site, or web mail site, for example, Facebook®, LinkedIn®, Twitter®, Google®, Gmail®, or others. Additional steps are also possible for authentication. In another embodiment, the user is additionally asked to recognize a combination of letters, numbers and symbols in an image and enter the combination into a box. An example of such a test is the Completely Automated Public Turing test to tell Computers and Humans Apart (CAPTCHA) test. In another embodiment, the user is asked a security question, to which the user only knows the answer. In yet another embodiment, the user may be asked additional personal information, such as date of birth and home address. In another embodiment, the user is asked to take a picture of himself or herself and the device interoperability system 200 will match the image to a pre-stored image. In yet another embodiment other biometric measures such as fingerprints scanning are used. The authentication data is used as a pre-shared key and authentication/encryption keys for encrypted connection are built.

In step 306, the user device saves the authentication/encryption keys and connection parameters for future use.

In step 307, connection 201-1 is established.

In step 308, OS 214 boots on user device 101-1.

In step 309, the user device 101-1 works in device interoperability system mode.

If the user does not accept the option of setting up for interoperability system mode in step 303, then in step 305, user device 101-1 determines if it is already set up for interoperability system mode. If in step 305 the user device 101-1 is already set up, then in step 310 the user device tries to establish a connection with device interoperability system 200 using the stored authentication keys and parameters.

Following on from step 310, if the connection establishment is successful in step 311 then the OS 214 boots on user device 101-1 (step 308), and the user device 101-1 works in device interoperability system mode (step 309).

If the connection is unsuccessful in step 311, then user device 101-1 loads its own OS in step 312. In step 313, the user device 101-1 works in stand-alone mode.

If in step 305 the user device is not already set up, then the user device 101-1 loads its own OS (step 312) and works in stand-alone mode (step 313).

In one embodiment, in order to improve speed of operation and to reduce the amount of data transmitted through a connection such as connection 201-1, the swap file or swap partition of OS 214 is placed on the storage of the user device 101-1.

In one embodiment, in order to improve speed of operation, caching is performed by, for example, setting aside a portion of the storage of the connected user device for a cache. In one embodiment, when OS 214 is booted, it will determine if there is a cache on the connected user device. Caching operations will be discussed in detail further below.

In one embodiment, at least some portion of the local storage of a user device connected to device interoperability system 200 is used by OS 214 to store data intended for use only on this particular device. An example is where user device 101-1 is a desktop used by user 100 specifically for running high resource demand applications such as video games. Then, some of the data necessary for running the high resource demand application is stored on the local storage of user device 101-1 instead of storage 212. In a further embodiment, the portion of the user device 101-1 storage which is to be used is recognized by OS 214 as a connected additional drive and presented accordingly.

In one embodiment, a portion of the local storage space of a user device connected to device interoperability system 200 is used by OS 214 to perform a backup of at least some of the data stored in storage 212. The amount of data which is backed up depends on the available capacity of the local storage of the user device. In a further embodiment, the backup is performed using a plurality of user devices. That is, data is backed up from storage 212 to a portion of each local storage space corresponding to each of the plurality of user devices.

In yet another embodiment, a backup status is associated with each portion of data stored in storage 212. Then when a backup operation is performed on that particular portion of data, the backup status is updated.

In a further embodiment, at least some of the data which is stored on the storage of user device 101-1 for either caching, swapping, expanding storage, backups or any combination of these purposes is placed in one or more partitions set up on the storage of user device 101-1. In another embodiment, the data which is stored on the storage of user device 101-1 for either caching, expanding storage, backups or any combination of these purposes is placed in one or more file-containers created in an existing partition of user device 101-1. This eliminates the need for repartitioning or erasing any data from the storage of user device 101-1.

In a further embodiment, the data which is stored on the storage of user device 101-1 for either caching, swapping, expanding storage, backups or any combination of these purposes is encrypted. The decryption keys are stored and managed by OS 214 thus preventing unauthorized access to the data.

Figure 3B:
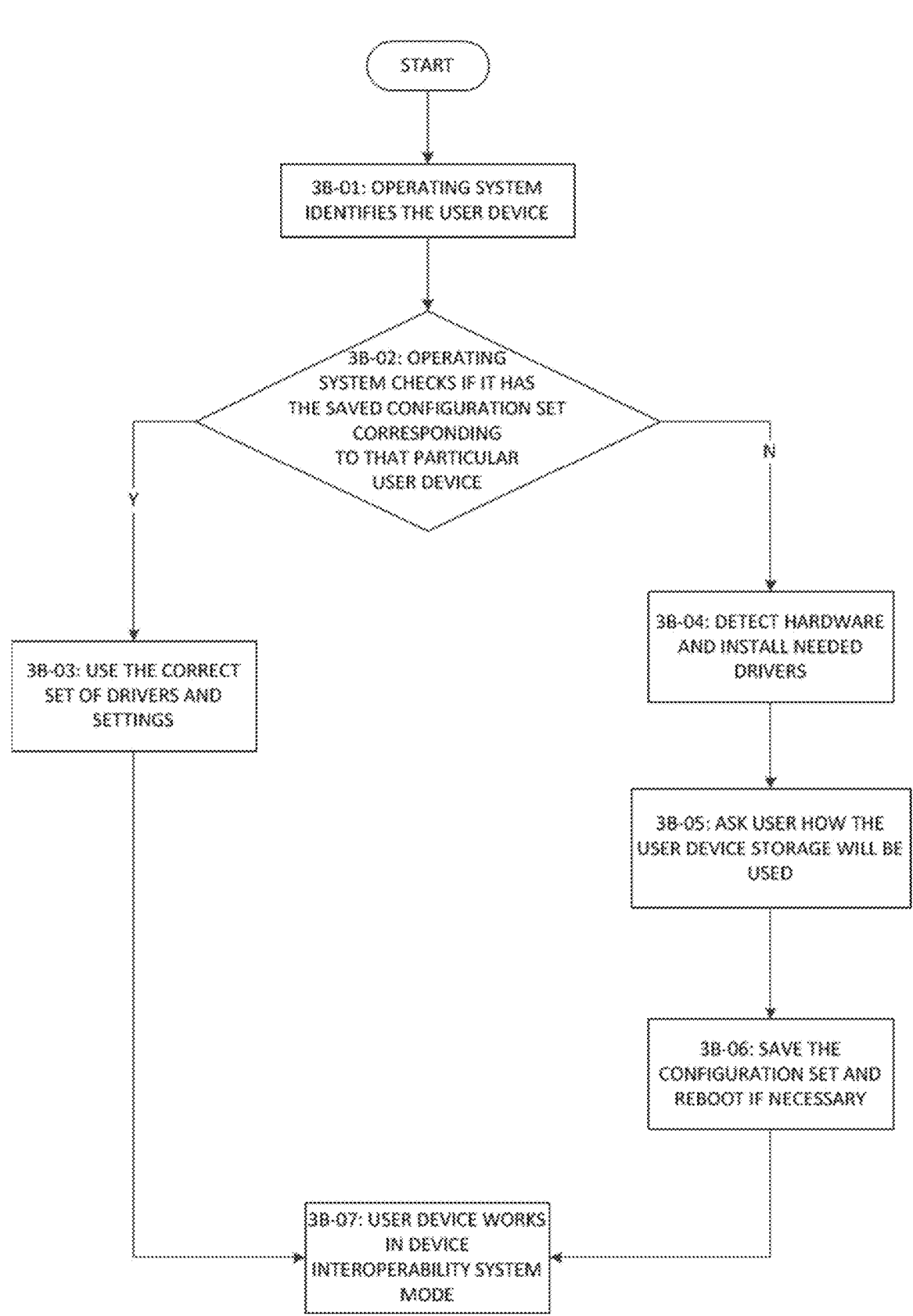
FIG. 3B shows an example algorithm for switching the operating system between different hardware configurations on booting.

In one embodiment, the OS 214 is able to switch between different hardware configurations during booting, such as in step 308 of FIG. 3. An example algorithm for switching between different hardware configurations is provided in FIG. 3B.

When the OS 214 is booted on a user device such as user device 101-1, then in step 3B-01 OS 214 identifies the user device. In step 3B-02, OS 214 determines whether it has stored the configuration set corresponding to the identified user device in storage 212. If yes, then in step 3B-03 OS 214 uses the correct set of drivers and setting for the identified user device. The user device then works in device interoperability system mode in step 3B-07.

If in step 3B-02 OS 214 is unable to find the configuration set corresponding to the identified user device in storage 212, then in step 3B-04 OS 214 will detect all hardware on this user device and install needed drivers automatically.

In step 3B-05, OS 214 prompts the user to enter one or more answers to one or more questions to determine how the user device storage will be used for the functioning of OS 214. Example questions include:

will the user device storage be used for caching?

will the user device storage be used for backups?

will the user device storage be used to provide additional storage space for OS 214 for its use?

how much space will be reserved for specified above purposes?

In step 3B-06, OS 214 will save the configuration set and reboot if necessary, before proceeding to work in device interoperability system mode in step 3B-07.

As mentioned previously, example embodiments of caching operations are discussed in detail below with reference to FIGS. 4, 4B and 4C.

Figure 4:
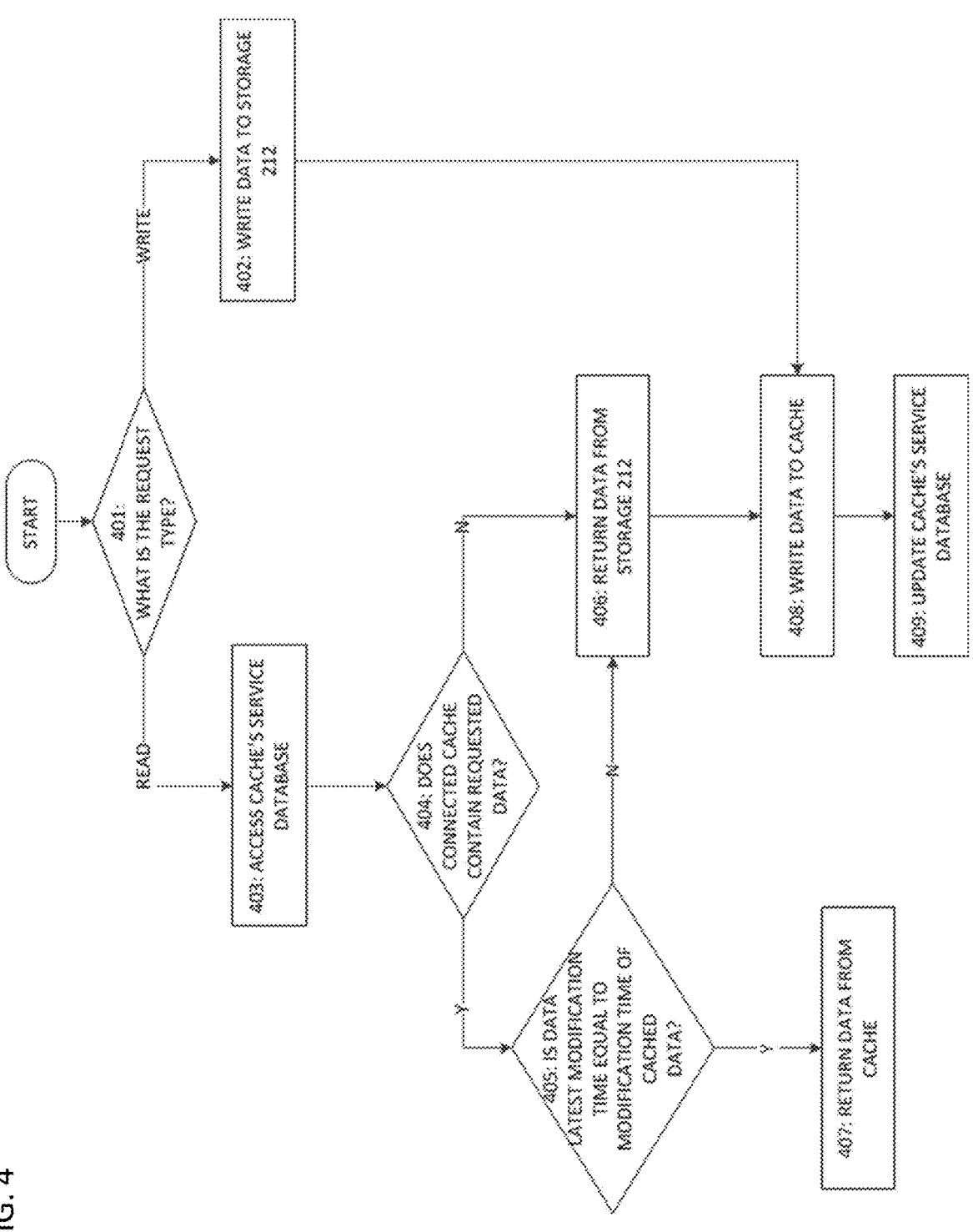
FIG. 4 shows an example embodiment of a caching operation.
Figure 4B:
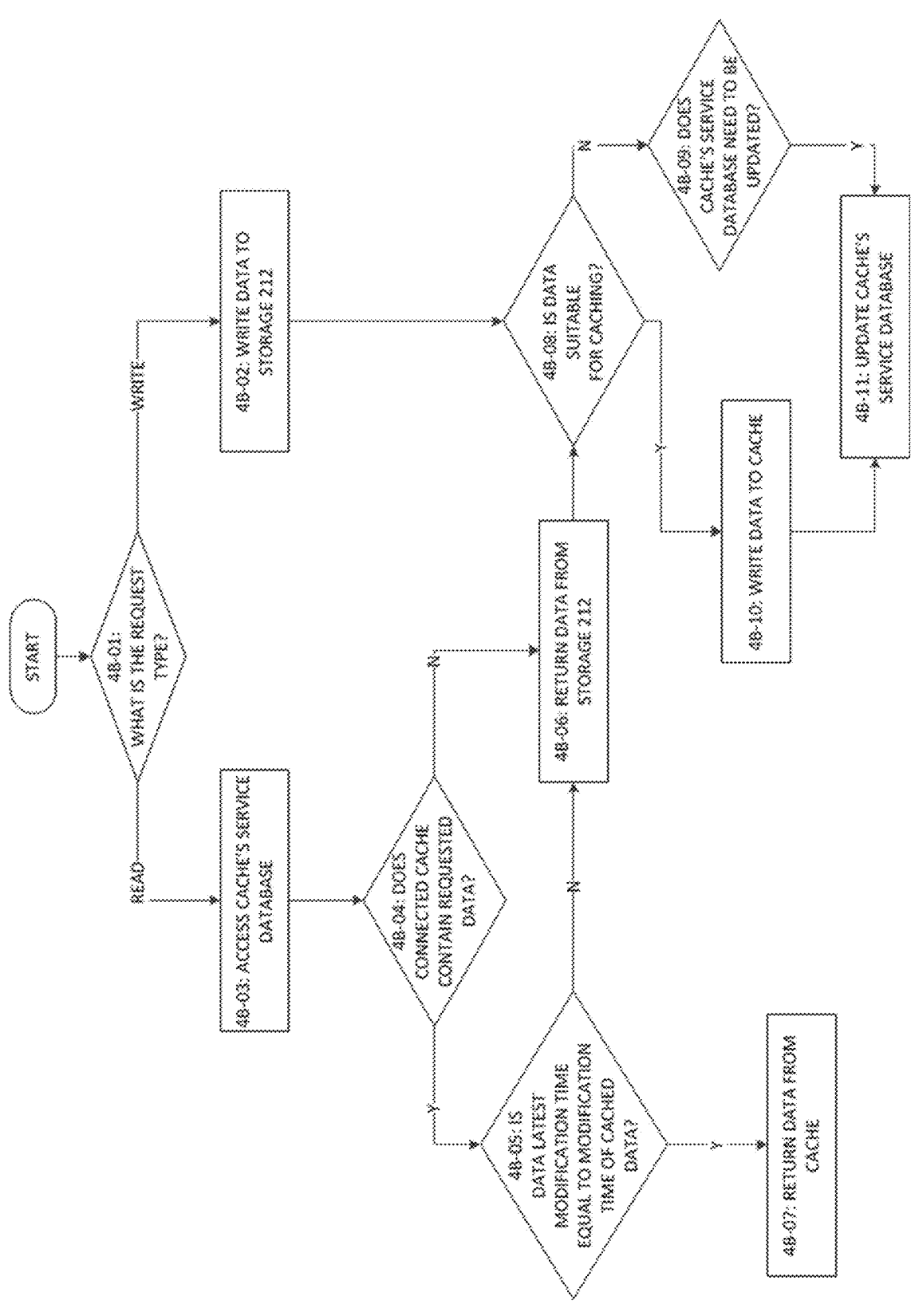
FIG. 4B illustrates an example embodiment of caching where additional checks are performed before writing data to the cache.

FIG. 4 shows an example flow when a received read or write operation request is processed by OS 214. In this example OS 214 is stored on the device where device interoperability system 200 is installed. This device is connected to user device 101-1. Also, a cache has been set up on user device 101-1.

In step 401, the request type is determined by OS 214.

If the request is determined to be for a read operation, then in step 403 the OS 214 determines if the cache contains the requested data. In one embodiment, OS 214 accesses the cache service database to determine if the cache set up on user device 101-1 contains the requested data. The cache service database describes modification times of the versions of the files stored in at least one of the caches of the user devices 101-1 to 101-N, and modification times of the original versions of those files stored in the storage 212. Determination if the cache contains the requested data is performed by comparison of those modification times. The cache service database is stored in storage 212.

Table 1 shows an example of a cache service database:

TABLE 1

| | Example of Cache Service Database | | | |
|---|---|---|---|---|
| File [1C-01] | Storage 212 [1C-02] | Cache #1 [1C-03] | Cache #2 [1C-04] | . . . |
| C:\path1\file1 [1R-01] | dd/mm/yy HH:MM:SS | dd/mm/yy HH:MM:SS | dd/mm/yy HH:MM:SS | |

TABLE 1-continued

| | Example of Cache Service Database | | | |
|---|---|---|---|---|
| File [1C-01] | Storage 212 [1C-02] | Cache #1 [1C-03] | Cache #2 [1C-04] | . . . |
| C:\path2\file2 [1R-02] | [1R-01, 1C-02] dd/mm/yy HH:MM:SS [1R-02, 1C-02] | [1R-01, 1C-03] n/a [1R-02, 1C-03] | [1R-01, 1C-04] dd/mm/yy HH:MM:SS [1R-02, 1C-04] | |
| . . . | | | | |

In Table 1, column 1C-01 represents the files. Each file corresponds to a separate row of Table 1. With reference to Table 1, file 1 is assigned to row 1R-01, file 2 is assigned to row 1R-02 and so on.

Column 1C-02 of Table 1 represents the modification times of the original versions of those files stored in the storage 212 and in at least one of the caches on the user devices 101-1 to 101-N. Then, referring to Table 1:

Cell [1R-01, 1C-02] represents the modification time of the original version of file 1 in storage 212, and Cell [1R-02, 1C-02] represents the modification time of the original version of file 2 in storage 212, Columns 1C-03 and 1C-04 represent the modification times of the versions of the file in the respective caches. For example, column 1C-03 corresponds to the cache 1 stored on user device 101-1, 1C-04 corresponds to cache 2 stored on user device 101-2, and so on. Then:

Cell [1R-01, 1C-03] represents the modification time of the version of file 1 in cache 1, Cell [1R-01, 1C-04] represents the modification time of the version of file 1 in cache 2, Cell [1R-02, 1C-03] represents the modification time of the version of file 2 in cache 1, and Cell [1R-02, 1C-04] represents the modification time of the version of file 2 in cache 2.

There are a variety of formats which can be used to represent the times in the cache service database. One example format is a two-digit representation of day/month/year followed by hour:minute:second or "dd/mm/yy HH:MM:SS".

There is a variety of other information which can be also included in the cache service database. For example, the cache service database can also include file sizes and checksums for data integrity checks.

In another embodiment the cache service database is based on file checksums instead of file modification times. Then, the cache service database describes checksums of the versions of the files stored in at least one of the caches of the user devices 101-1 to 101-N, and checksums of the original versions of those files stored in the storage 212. Determination if the cache contains the requested data is performed by comparison of those checksums.

If the data cannot be found on the cache in step 404, or the data on the cache has a modification time which is different from the modification time of the corresponding data on storage 212 (step 405), or the checksums are different; then OS 214 retrieves the data from storage 212 (step 406). In step 408, the retrieved data is then written into the cache, so that subsequent data read operations are performed using the cache. This also has the advantage of reducing the power consumption of the device where device interoperability system 200 is installed, as data does not have to be transmitted from this device to user device 101-1 via connection 201-1. In step 409, the cache service database is also updated.

If, in step 404 the data is found on the cache, and the data on the cache matches the corresponding data on storage 212 (step 405); then in step 407 the data is read from the cache.

In a further embodiment, if the request type is determined to be a write operation in step 401, then in step 402 OS 214 performs a data write operation. In one embodiment, this data write operation is performed in write-through mode. Then, following from the OS 214 writing the data to storage 212 via connection 201-1 in step 402, OS 214 also writes data to the user device 101-1 cache in step 408. In step 409, the cache service database is also updated.

In another embodiment, one or more additional checks are performed to determine whether the data should be written to the cache. FIG. 4B illustrates an example of an embodiment. Steps 4B-01 to 4B-07 are similar to steps 401-407 in FIG. 4. In step 4B-08, additional checks are used to determine if the data is suitable for caching. Examples of the factors which are examined to determine if the data is suitable for caching include:

Maximum capacity of the cache,
Utilization of the cache capacity,
Size of data item,
Usage frequency of data item,
Time expiration of data item,
Currently running applications,
Previously collected data usage patterns, and
Device type of user device 101-1.

If the data is determined to be suitable for caching in step 4B-08, then in step 4B-10 the data is written to the cache and in step 4B-11 the cache service database is updated.

In one embodiment, the OS 214 performs additional cache servicing functions, for example:

cache defragmentation, or
deletion of less cache-suitable data to free up space.

Then, the above-described factors used in step 4B-08 are used to optimize the performance of these additional cache servicing functions as well.

In a further embodiment, if the data is determined to not be suitable for caching in step 4B-08, then in step 4B-09 an additional check to determine the necessity of updating of the cache service database is performed. For example, if the data is determined not to reside in any cache of any user device, then it is unnecessary to update the cache service database.

In one embodiment, when user device 101-1 runs OS 214, data is prefetched from storage 212 and used to update the user device 101-1 cache. That is, data is fetched from storage 212 and transmitted to the user device 101-1 cache in readiness for future use.

Figure 4C:
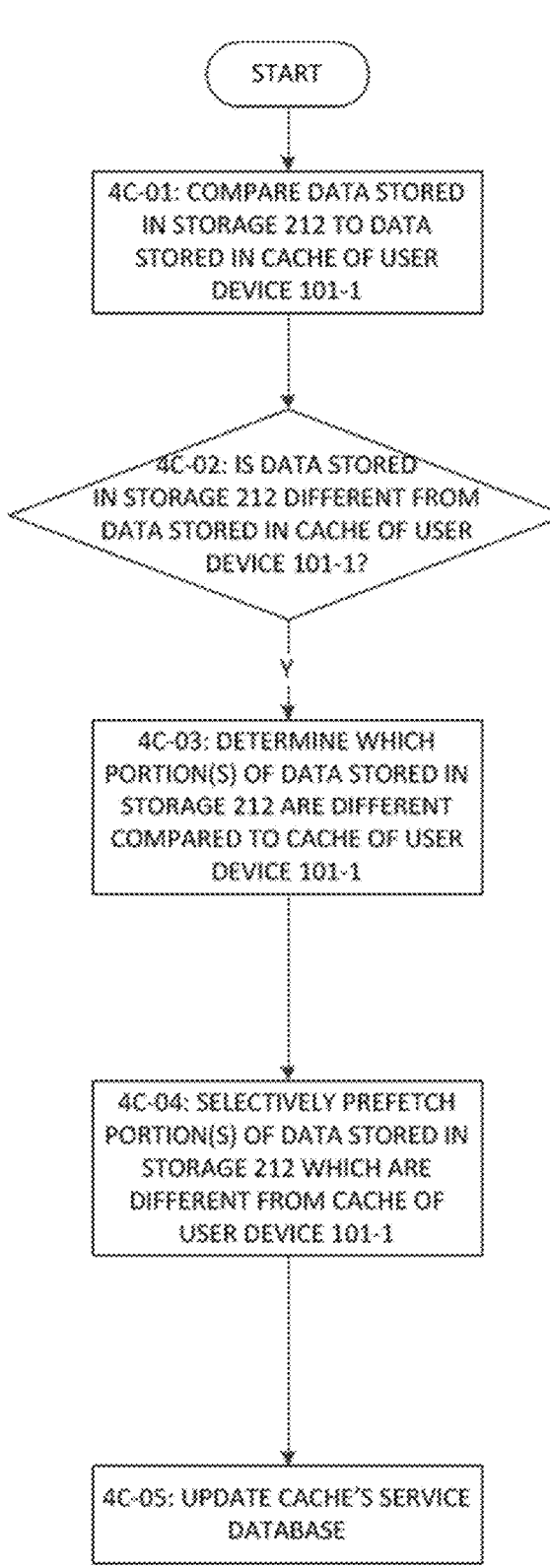
FIG. 4C shows an example embodiment of prefetching to a cache.

FIG. 4C shows an example embodiment of prefetching. In step 4C-01, data stored in storage 212 is compared by the OS 214 to the data stored in the user device 101-1 cache. The OS 214 performs the data comparison by comparing the information from the cache service database corresponding to user device 101-1, to the information stored in file system of the storage 212.

If the data stored in the connected cache is determined not to match the data stored in storage 212 in step 4C-02, then in step 4C-03 the OS 214 determines which of the one or more portions of data stored in storage 212 are different compared to the data on the user device 101-1 cache.

In a further embodiment, in step 4C-04, OS 214 selectively prefetches one or more portions of data stored in storage 212 which are different from the data stored in the cache of user device 101-1.

The selection and prioritization of data depends on several factors:

Connection of the device where device interoperability system 200 is installed to a power source,
Charge level of battery 211,
Total capacity of battery 211,
Current utilization of connection 201-1,
Current user activity,
Current hardware utilization of user device 101-1
Maximum capacity of the connected cache,
Utilization of the cache capacity,
Size of data portion,
Usage frequency of data item,
Time expiration of data item,
Currently running applications,
Previously collected data usage patterns, and
Device type of user device 101-1.

Then in step 4C-05, the cache service database is updated accordingly based on the data stored in the user device 101-1 cache.

In one embodiment, security measures are used so as to reduce the risk of a malicious party gaining access to device interoperability system 200. For example, in one embodiment access to device interoperability system 200 is secured using biometric measures such as fingerprints scanning or facial recognition.

In other embodiments, multi-factor authentication is used to secure device interoperability system 200. In some embodiments, a multi-factor authentication process is based on the following factors, or answering the following questions:

The knowledge factor, or what I know;
The possession factor, or what I have; and
The inherence factor, or what I am.

In one embodiment, the OS 214 is able to pause its operation if the connection 201-1 is lost, and resume operation immediately when the connection is reestablished.

In one embodiment, OS 214 includes one or more kernels corresponding to one or more architectures. For example, OS 214 includes kernels for the x86 and ARM architectures. Then depending on the architecture of the connected user device, the appropriate kernel is used automatically. This behavior is completely transparent for the user.

In one embodiment, a graphical user interface (GUI) is generated on user device 101-1 to enable the user to interact and interface with user device 101-1 including OS 214. In one embodiment, the OS 214 automatically optimizes and adapts the GUI according to the following factors:

physical form-factor of the user device 101-1. For example, what type of device is user device 101-1? Is it a laptop, tablet, TV set, game console or integrated in-car system?
number and size of screens associated with the user device 101-1;
screen resolution; and
input methods. For example, is the input device a keyboard and mouse, touchscreen, infrared remote control or gamepad?

Examples of GUI optimizations and adaptations include:
adjusting the size and placement of GUI control elements such as buttons and checkboxes;
adjusting the size and placement of windows;
enabling or disabling specific text input methods such as on-screen keyboard or voice text input; and
enabling or disabling GUI parts for device-specific features such as controls for in-car air conditioning system.

In one embodiment, OS 214 is only able to work on one connected user device at a time. An example is when OS 214 is running on user device 101-1. Then, to work on a different user device such as user device 101-2 after establishing connection 201-2, in one embodiment OS 214 must be shut down on user device 101-1, then booted on user device 101-2. In another embodiment, OS 214 operation on user device 101-1 is first paused. Then OS 214 is either booted or, if it was previously paused, resumed on user device 101-2.

In another embodiment, OS 214 is able to work with a plurality of user devices such as, for example, user devices 101-1, 101-2 and 101-3. In order to enable this, in an embodiment communications module 213 is able to establish and simultaneously maintain connections 201-1, 201-2 and 201-3 with user devices 101-1, 101-2 and 101-3 respectively. Then, user devices 101-1, 101-2 and 101-3 are simultaneously connected to the device interoperability system 200 and each one of these user devices runs its instance of OS 214 in parallel with each other. In one embodiment, the transmission capacity of communications module 213 is balanced between connections 201-1, 201-2 and 201-3 according to the current utilization of each connection.

In a further embodiment, different instances of OS 214 which are simultaneously running on user devices 101-1, 101-2 and 101-3 use the distributed lock management approach to coordinate concurrent access to the storage 212. For example, the lock managers of all three instances of OS 214 which are running on the user devices 101-1, 101-2 and 101-3, use the same lock database which is distributed among these instances by means of device interoperability system 200 and connections 201-1, 201-2 and 201-3.

In one embodiment, the interoperability system 200 is used by the different instances of OS 214 which are simultaneously running on different user devices to exchange some details about their current status. This, for example, includes:

number and device types of simultaneously working user devices, status of important OS service functions, for example, an OS update process, current user activity, and currently running applications.

This data is used by every running instance of OS 214 to coordinate and optimize its service functions. For example, when three instances of OS 214 are running on user devices 101-1, 101-2 and 101-3, coordination is performed to ensure that the OS update process is not running simultaneously on all three devices. In a further embodiment, this data is used to prioritize the balancing of the transmission capacity of communications module 213 between established connections 201-1 to 201-3. For example, a higher priority is given to that user device which user 100 currently uses.

In yet another embodiment, the OS 214 supports migration of running applications between OS instances running on different user devices. With reference to the example above, OS 214 supports the ability to move a currently running application from user device 101-2 to user device 101-3. After the migration, the application continues to have access to any previously opened files. In a further embodiment, the data described previously is used to present more details to a user if the user opts to migrate applications and the connections 201-2 and 201-3 are used to facilitate the migration process.

The use of device interoperability system 200 offers several other advantages. In some embodiments, device interoperability system 200 is used in conjunction with cloud-based data synchronization capabilities. For example, if cloud-based services are used for synchronization of data between different user devices, device interoperability system 200 reduces the necessity for user devices to connect to the cloud to perform data synchronization. Instead, the user devices use data from storage 212. This reduces the utilization of the cloud connection with the user devices. Furthermore, in some embodiments, the device interoperability system 200 ensures data availability in case cloud connectivity is lost or not available, as the user devices can retrieve data from storage 212. In some embodiments, intelligent approaches to ensuring availability of data which is most likely to be relevant to a user are employed. These include, for example, approaches based on:

Temporal locality: Data which was most recently used on a user device is stored on storage 212 as it is likely that the user device will use this data again in the near future.

Spatial locality: Data sets which occupy memory locations close to recently used data are stored on storage 212 as it is likely that the user device will use these data sets in the near future.

Branch locality: In cases where there are multiple possible outcomes from conditional branching instructions, then data related to each of these outcomes are stored on storage 212 as it is likely that the user device will use this data.

Probabilistic analysis of user interactions with user devices: For example, if there is a high probability that a user will use one or more data sets either in conjunction with or after using a particular program, then these data sets are stored on storage 212.

In some embodiments, some user data is stored on storage 212 but not within the cloud. This capability is useful if, for example, users want to keep control of sensitive data.

On its own, the feature of storing some user data within local storage and not in the cloud has been implemented in, for example, the Samsung Galaxy S10. The Samsung Galaxy S10 is built with the new defence-grade proprietary Samsung Knox platform, and has secure storage backed by hardware to house private keys for blockchain-enabled mobile services, as discussed in, for example, https://news-.samsung.com/global/samsung-raises-the-bar-with-galaxy-s10-more-screen-cameras-and-choices, retrieved Mar. 20, 2019. This feature enables Samsung Galaxy S10 users to keep control of their private keys rather than exposing it to potential security breaches in the cloud.

The security of this feature is enhanced by the addition of device interoperability system 200. In particular, this enhancement is achieved by running device interoperability system 200 on a device or gadget where storage 212 has these secure storage capabilities, and allowing only user devices that are connected to device interoperability system 200 and have been booted up using OS 214 to access the data stored within storage 212. As will be seen below, this enables the creation of a more secure and private ecosystem.

For example: In the case where private keys for blockchain-enabled mobile services are stored on storage 212, only user devices that are connected to device interoperability system 200 and have been booted up using OS 214 are able to access these private keys. This is useful, for example, to ensure that the user is able to securely perform cryptocurrency transactions.

Sensitive data can be further secured through other means. For example, in some embodiments, as explained previously, the sensitive user data is encrypted prior to being stored in storage 212. In some of these embodiments, the user selects the type of encryption to be used.

In other embodiments, sensitive user data is not accessible directly to user devices that have been connected to device interoperability system 200 and have been booted up using OS 214. Instead, only the results of processing or operations performed by, for example, one or more programmes which are part of programmes and data 216 residing on storage 212 and which uses the sensitive data, are made available to the user devices. For example, if the user using user device 101-3 wants to perform cryptocurrency transactions and needs to access private keys to sign transactions, then the transactions which require signing are transmitted from the user device 101-3 over connection 201-3 to the device interoperability system 200. At device interoperability system 200, the transactions are signed using one or more programmes resident on storage 212. The signed transactions are then transmitted back over connection 201-3 to the user device 101-3. This way, user device 101-3 does not access the sensitive user data at all.

In some embodiments, the availability of the sensitive user data or the results of processing or operations which use the sensitive data is based on a security level associated with the user device. This is illustrated with reference to user device 101-3. For example, in some embodiments, the user device 101-3 is considered to have a low security level if it is publicly accessible. If user device 101-3 is only privately accessible and access is secured using, for example, two authentication factors as described previously, it is considered to have a very high security level.

Figure 5:
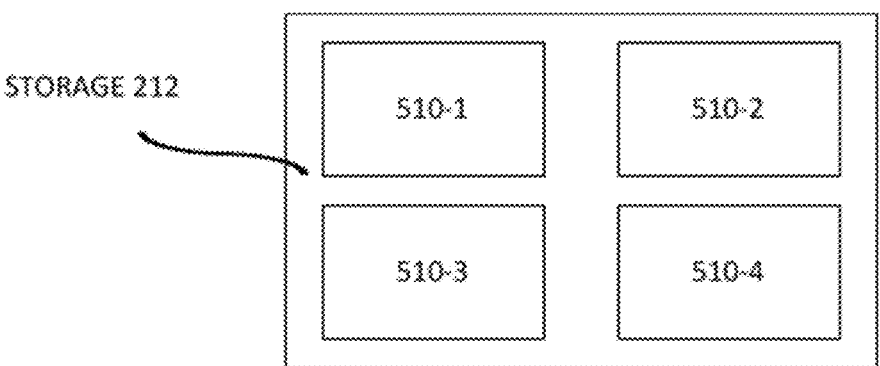
FIG. 5 illustrates an example embodiment of different storage sub-areas, each having different associated security levels.

In some embodiments, storage 212 comprises several storage sub-areas, wherein each sub-area has a different associated security level. An example embodiment is shown in FIG. 5, where storage 212 comprises one or more sub-areas 510-1 to 510-4. Then, for example:

Sub-area 510-1 has the highest level of security,
Sub-area 510-2 has the second highest level of security,
Sub-area 510-3 has the third highest level of security, and
Sub-area 510-4 has the lowest level of security.

The Samsung Galaxy S10 is an example of this, as it has a secure storage sub-area to store private keys for blockchain-enabled mobile services and a less secure storage sub-area. This can also be used to differentiate the level of access of a user device to data. For example:

the most sensitive data is stored in the most secure storage sub-area,
the next most sensitive data is stored in the next most secure storage sub-area, and so on.

The implementation of sub-areas within storage 212 into sub-areas can be carried out in a variety of ways. In some embodiments, the implementation is performed physically, that is, each sub-area corresponds to a different physical storage area. In some embodiments, the implementation is performed virtually, that is, a physical storage area is partitioned into different sub-areas. In yet other embodiments, a combination of virtual and physical implementations is used.

In some embodiments, the above concepts are combined to create a hierarchical or differentiated system of secure storage for a user's data. This hierarchy has a plurality of levels, wherein each level of the hierarchy corresponds to a different level of data sensitivity and therefore required security.

Figure 6:
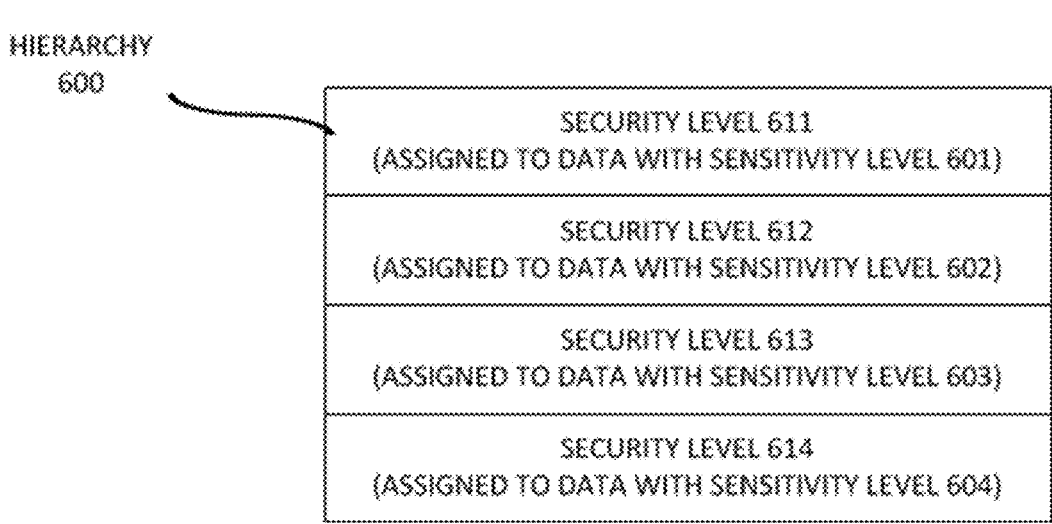
FIG. 6 illustrates an example embodiment of a hierarchy of secure storage for a user's data.

FIG. 6 shows an example embodiment of such a hierarchy 600. In hierarchy 600, Sensitivity level 601 corresponds to the user's most sensitive data, and the highest level of security 611 is assigned to data with sensitivity level 601.

Sensitivity level 602 corresponds to the user's second most sensitive data, and the second highest level of security 612 is assigned to data with sensitivity level 602.

Sensitivity level 603 corresponds to the user's third most sensitive data, and the third highest level of security 613 is assigned to data with sensitivity level 603, and Sensitivity level 604 corresponds to the user's least sensitive data, and the lowest level of security 614 is assigned to data with sensitivity level 604.

Then the accessibility to the data is based on the security level which has been assigned to the data. An example of this is demonstrated below with reference to FIGS. 5 and 6. For example:

Data with security level 611 is not accessible to user devices and is stored in storage sub-area 510-1. The results of processing or operations which use the data are accessible to a user device, if the user device has been connected to device interoperability system 200,
the user device was booted by OS 214, and
the security level associated with the user device is very high;

Data with security level 612 is stored in storage sub-area 510-2. It is accessible to a user device, if the user device has been connected to device interoperability system 200,
the user device was booted by OS 214, and
the security level associated with the user device is high;

Data with security level 613 is stored in storage sub-area 510-3. It is accessible to a user device if the user device has been connected to device interoperability system 200,
the user device was booted by OS 214, and
the security level associated with the user device is medium; and Data with security level 614 is stored in the cloud.

User data can be assigned to one of sensitivity levels 601-604 using different techniques. In some embodiments, assignment is based on user inputs on a user interface presented to the user at a user device. The user interface is, for example, a GUI. An example embodiment is as follows: A user assigns data to one of the levels by selecting a sensitivity setting of Very High, High, Medium, Low corresponding to levels 601-604. Then, based on this setting, one of the security levels described above is assigned to the data.

In other embodiments, user data is assigned to one of levels 601-604 based on the type of data. For example, sensitivity level 601 may be assigned to data related to an ultra-secure cryptocurrency "cold wallet" such as cryptocurrency, public and private keys as well as signing private keys for cryptocurrency transactions. Sensitivity level 602 may be assigned to user Personal Identification Numbers (PINs) and passwords for financial applications. Sensitivity level 603 is assigned to user media files that the user has indicated are sensitive. Finally, sensitivity level 604 is assigned to other user data which the user has allowed many cloud-based applications to use.

The above shows an embodiment where one level of security is assigned based on the sensitivity level of the data. In some embodiments, more than one level of security to be assigned based on the sensitivity level of the data. In some of these embodiments, based on the sensitivity level of the data, a minimum level of security is assigned. Then, any level of security either at or above that minimum level can be assigned to the data. For example, the minimum level for data with sensitivity level 602 is set to security level 612. Therefore, security levels 611 and 612 can be assigned to the data. Similarly, the minimum level for data with sensitivity level 603 is set to security level 613. Then security levels 611, 612 and 613 can be assigned to that data.

The above embodiments enable the creation of a secure, private ecosystem where sensitive data is stored within storage 212 of device interoperability system 200, and only devices which connect to device interoperability system 200 and are booted by OS 214 can access this data. Furthermore, the above details embodiments for a hierarchical or differentiated system of secure storage.

The use of device interoperability system 200 also offers advantages for IoT-enabled user devices. Similar to as with cloud-based services, device interoperability system 200 reduces the need to connect to the cloud to perform data synchronization. Furthermore it reduces the difficulty of having to maintain separate cloud credentials and device settings for user devices.

The hierarchical or differentiated system of secure storage mentioned above is of particular importance for IoT-enabled devices, as many of these devices are publicly accessible and may be difficult to monitor, thereby reducing the level of security associated with these devices. By using a hierarchical or differentiated system of secure storage, such devices can be used as part of a secure and private ecosystem without jeopardizing the overall level of security and privacy of the ecosystem.

It is also possible to perform data restore in the event of damage or loss of the device where device interoperability system 200 is installed. As previously described, in some embodiments OS 214 backs up data from storage 212 to a portion of each local storage space corresponding to each of the user devices connected to device interoperability system 200. Embodiments to perform caching were also previously described above. Then, in some embodiments, OS 214 uses the data stored in the one or more caches corresponding to the user devices connected to device interoperability system 200, in conjunction with the data backed up on a portion of the local storage space of the user devices connected to device interoperability system 200, to perform a data restore.

Figure 7A:
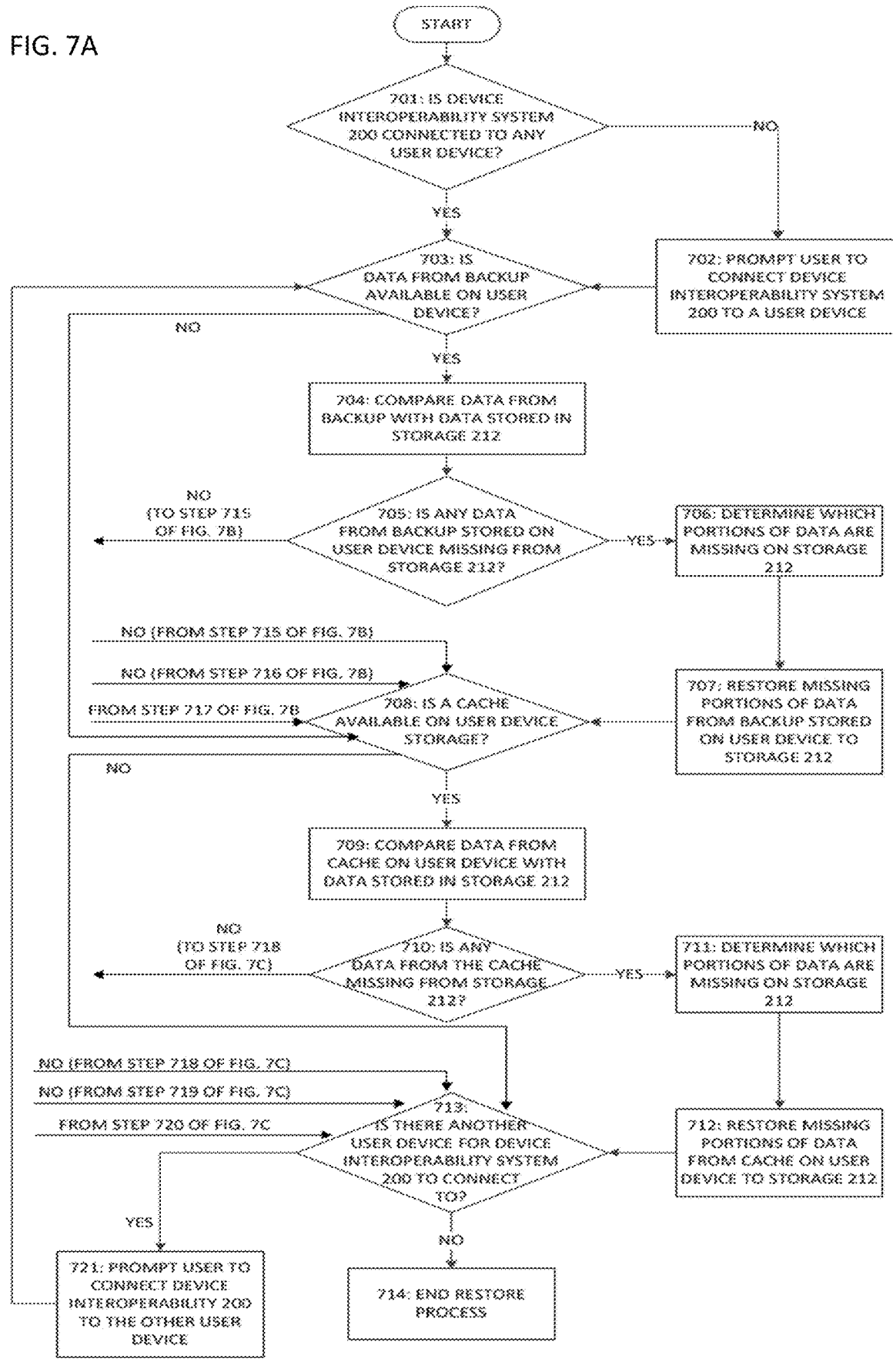
FIG. 7A illustrates part of an example embodiment of a data restore process.
Figure 7B:
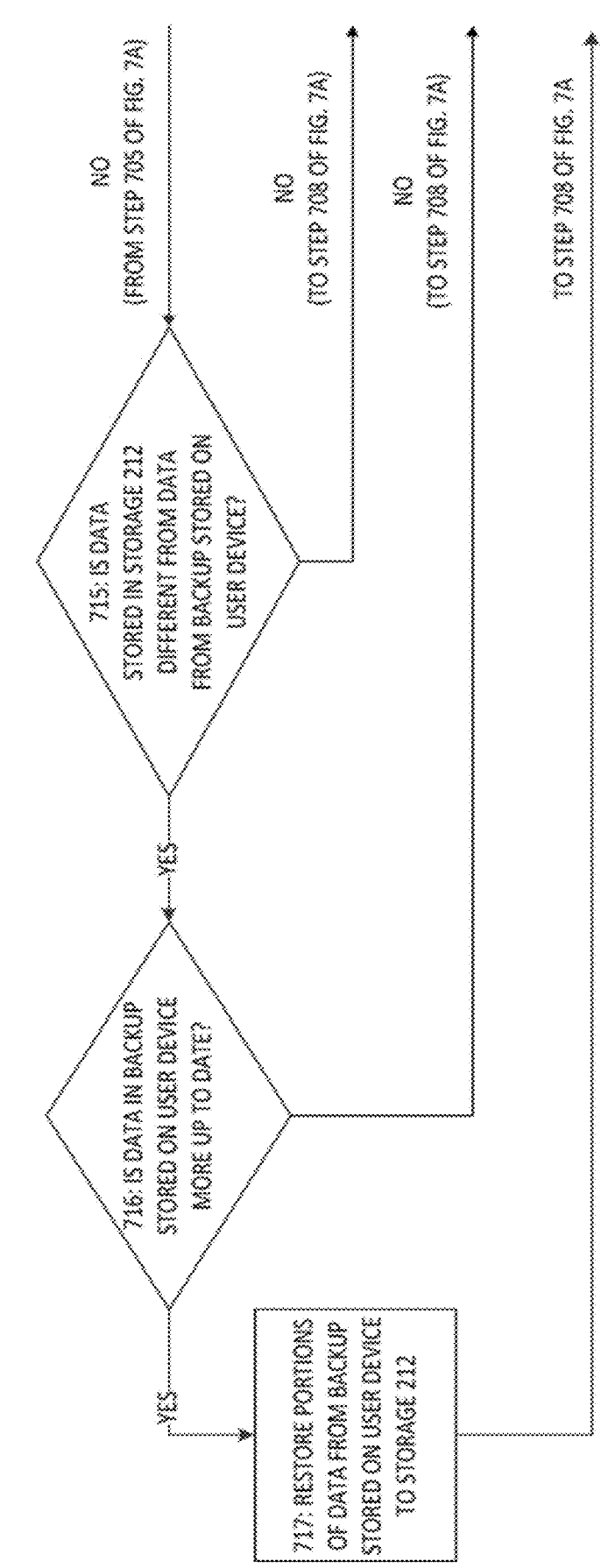
FIG. 7B illustrates part of an example embodiment of a data restore process.
Figure 7C:
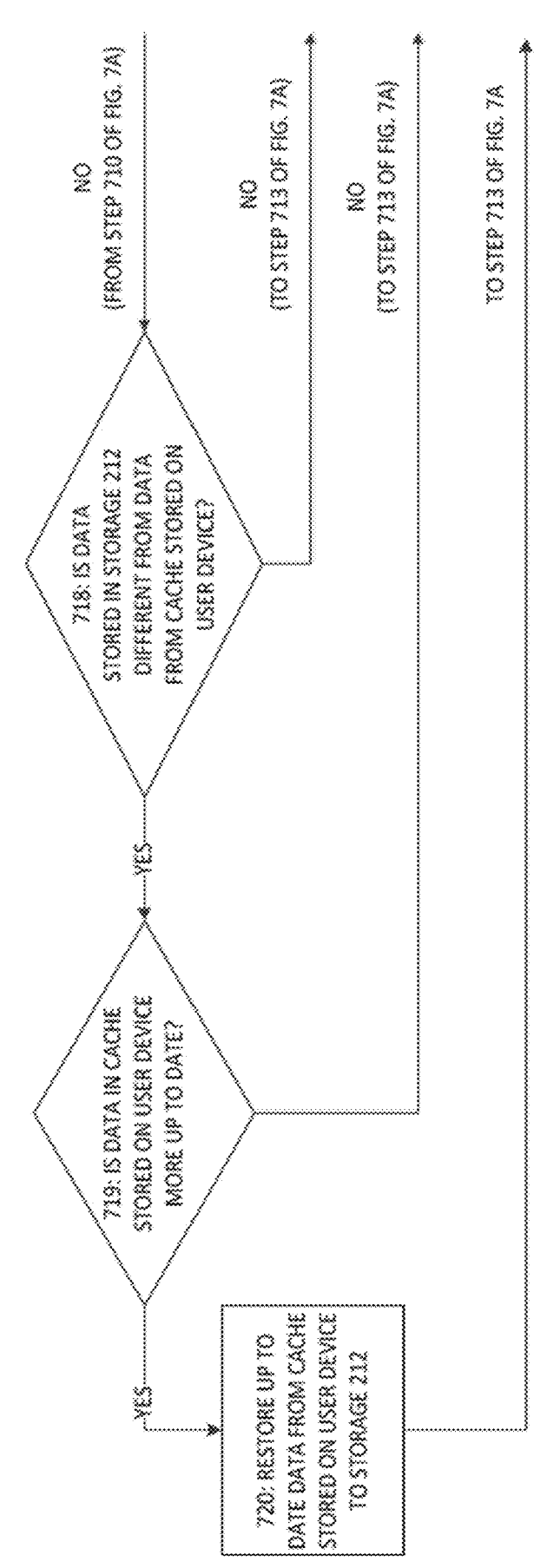
FIG. 7C illustrates part of an example embodiment of a data restore process.

FIGS. 7A-7C illustrate an exemplary embodiment of a data restore process performed by OS 214 which uses the data stored in the one or more caches and the data backed up on the user devices to perform a data restore. In step 701, OS 214 checks to see if device interoperability system 200 is connected to any of the user devices. If no, then in step 702, the user is prompted to connect device interoperability system 200 to a user device. If device interoperability system 200 is connected to a user device, or after connection to a user device in step 702, then in step 703 OS 214 checks to see if data from a previous backup operation is available on the user device. If yes, then in step 704, OS 214 compares data from the backup with data stored in storage 212. If no, then OS 214 progresses to step 708 which will be explained further below.

Once step 704 is completed, in step 705 OS 214 determines if any data from the backup stored on the user device is missing from storage 212. If yes, then in step 706 OS 214 determines the data which is missing from storage 212. Once step 706 is completed, then data is restored from the backup on the user device to storage 212 in step 707.

If in step 705 OS 214 determines that there is no data from the backup on the user device missing from storage 212, then in step 715 of FIG. 7B OS 214 determines if the data from the backup on the user device is different to the data stored on storage 212. If in step 715, OS 214 determines that there is no difference, then OS 214 progresses on to step 708 of FIG. 7A. If OS 214 determines that there is a difference, then in step 716 OS 214 determines whether the data in the backup stored on the user device is more up to date than the data stored in storage 212. If the data in the backup stored on the user device is less up to date, then OS 214 progresses on to step 708 of FIG. 7A. If the OS 214 determines in step 716 that the data in the backup stored on the user device is more up to date, then OS 214 restores the up to date data from the backup to storage 212. Once step 717 is completed, OS 214 progresses to step 708 of FIG. 7A.

In step 708, OS 214 determines if there is a cache available on the user device storage. If there is no cache available, then OS 214 progresses to step 713 which will be explained further below. If there is a cache available, then in step 709 OS 214 compares data from the cache with the data stored in storage 212 to see if there is data present in the cache which is missing from storage 212. In one embodiment, the cache service database which is stored on the user device is used to determine if there is data present on the cache which is missing from storage 212 in step 709. If OS 214 determines in step 710 that there is data missing, then in step 711, OS 214 determines which portions of data are missing on storage 212. Once step 711 is completed, then in step 712 OS 214 restores the missing portions of data from the cache to storage 212. OS 214 then progresses to step 713.

If OS 214 determines in step 710 that there is no data missing, then in step 718 of FIG. 7C, OS 214 determines if the data stored in storage 212 is different from the data from the cache stored on the user device. In some embodiments, the cache service database which is stored on the user device is used to determine if the data present on the cache is different from the data stored on storage 212 in step 718. If there is no difference, then OS 214 progresses to step 713 of FIG. 7A. If there is a difference, then in step 719 OS 214 determines if the data stored in the cache is more up to date than the data stored in storage 212. If the data stored in the cache is less up to date, then OS 214 progresses to step 713. If it is more up to date, then in step 720 OS 214 restores the up to date data from the cache to storage 212. Once step 720 is completed, OS 214 progresses to step 713 of FIG. 7A.

In step 713 of FIG. 7A, OS 214 determines if there is another user device for device interoperability system 200 to connect to. If there is another user device available for connection, then OS 214 prompts the user to connect device interoperability system 200 to the other user device in step 721. After completing step 721, OS 214 returns to perform step 703. If there is no other user device available, then OS 214 stops the restore process in step 714.

Variations on the above are also possible. For example, in some embodiments, only data stored in the cache is used by OS 214 for data restore. An exemplary embodiment is illustrated with reference to FIGS. 8A and 8B. In step 801, similar to step 701, OS 214 checks to see if device interoperability system 200 is connected to any of the user devices. If no, then in step 802, similar to step 702, OS 214 prompts the user to connect device interoperability system 200 to a user device. If device interoperability system 200 is connected to a user device, or after connection to a user device in step 802, then in step 808 OS 214 determines if there is a cache available on the user device storage, similar to previously disclosed step 708, If there is no cache available, then OS 214 progresses to step 813 which is similar to step 713. If there is a cache available, then in step 809 (similar to step 709) OS 214 compares data from the cache with the data stored in storage 212 to see if there is data present in the cache which is missing from storage 212. In one embodiment, the cache service database which is stored on the user device is used to determine if there is data present on the cache which is missing from storage 212 in step 809. If OS 214 determines in step 810 (similar to step 710) that there is data missing, then in step 811 (similar to step 711), OS 214 determines which portions of data are missing on storage 212. Once step 811 is completed, then in step 812 (similar to step 712) OS 214 restores the missing portions of data from the cache to storage 212. OS 214 then progresses to step 813.

Figure 8A:
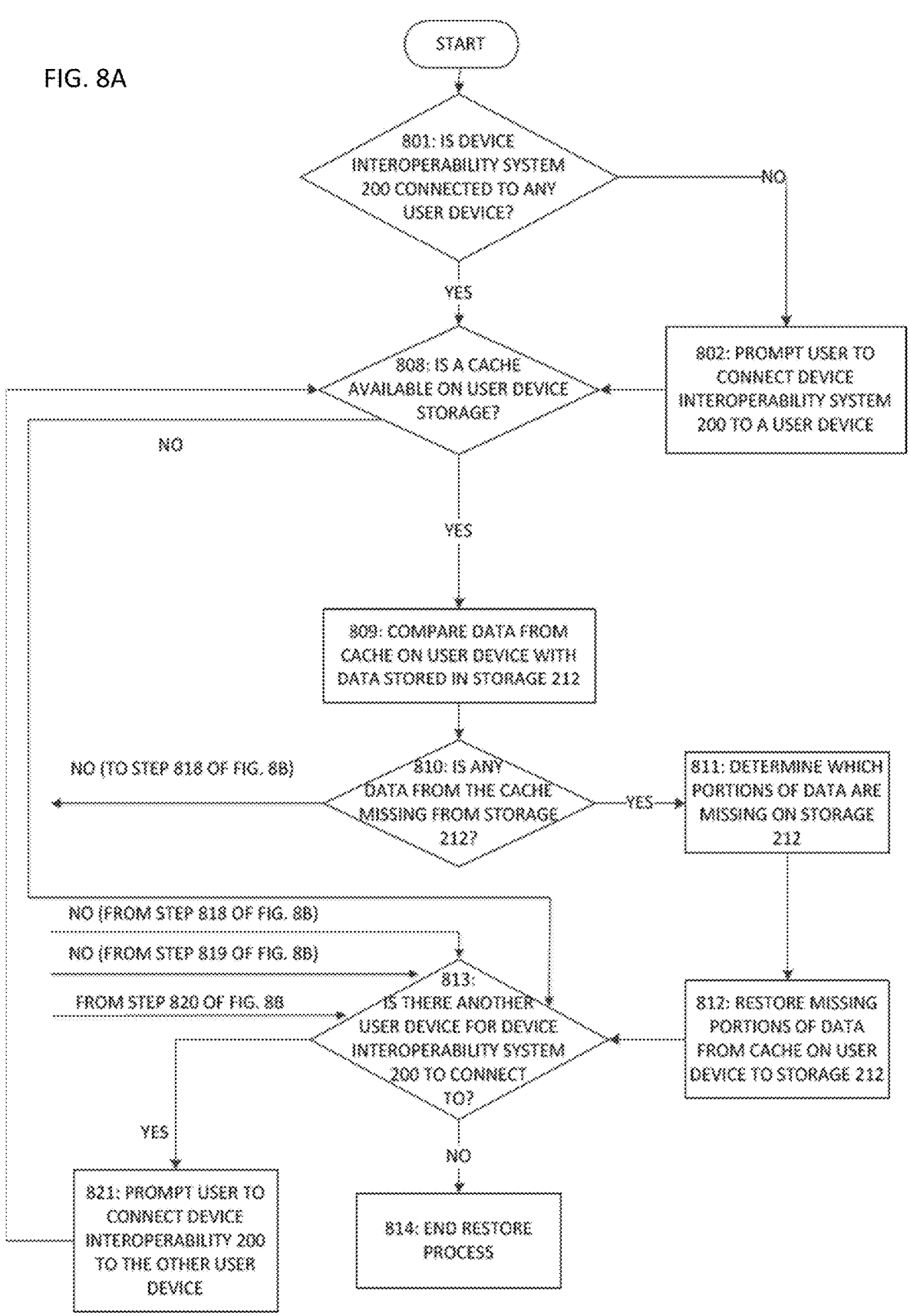
FIG. 8A illustrates part of an example embodiment of a data restore process where only data stored in a cache is used for data restore.
Figure 8B:
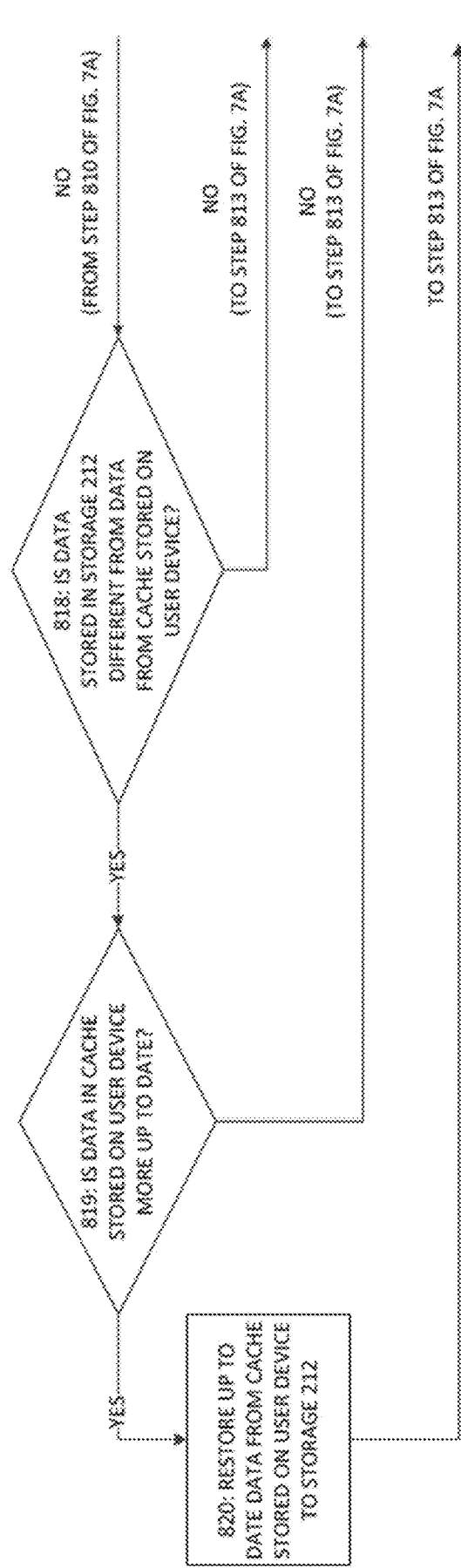
FIG. 8B illustrates part of an example embodiment of a data restore process where only data stored in a cache is used for data restore.

If OS 214 determines in step 810 that there is no data missing, then in step 818 (similar to step 718 of FIG. 7C) of FIG. 8B, OS 214 determines if the data stored in storage 212 is different from the data from the cache stored on the user device. In some embodiments, the cache service database which is stored on the user device is used to determine if the data present on the cache is different from the data stored on storage 212 in step 818. If there is no difference, then OS 214 progresses to step 813 of FIG. 8A. If there is a difference, then in step 819 (similar to step 719 of FIG. 7C) OS 214 determines if the data stored in the cache is more up to date than the data stored in storage 212. If the data stored in the cache is less up to date, then OS 214 progresses to step 813. If it is more up to date, then in step 820 (similar to step 720 of FIG. 7C) OS 214 restores the up to date data from the cache to storage 212. Once step 820 is completed, OS 214 progresses to step 813 of FIG. 8A.

In step 813 of FIG. 8A, OS 214 determines if there is another user device for device interoperability system 200 to connect to. If there is another user device available for connection, then OS 214 prompts the user to connect device interoperability system 200 to the other user device in step 821 (similar to step 721). After completing step 821, OS 214 returns to perform step 808. If there is no other user device available, then OS 214 stops the restore process in step 814, similar as in what would have happened in step 714.

As previously explained and as shown in step 4C-04 of FIG. 4C, OS 214 selectively prefetches one or more portions of data stored in storage 212 which are different from the data stored in the cache of a user device, and the selection and prioritization of data depends on several factors. In additional embodiments, these factors include the previously discussed backup status associated with each portion of data.

In one embodiment, when a portion of the data is about to be deleted from the cache, an additional check of its backup status is performed by OS 214. For example, if there are no more copies of particular portion of the data stored on other user devices or at other backup locations then this portion of data will not be deleted from the cache.

Figure 9A:
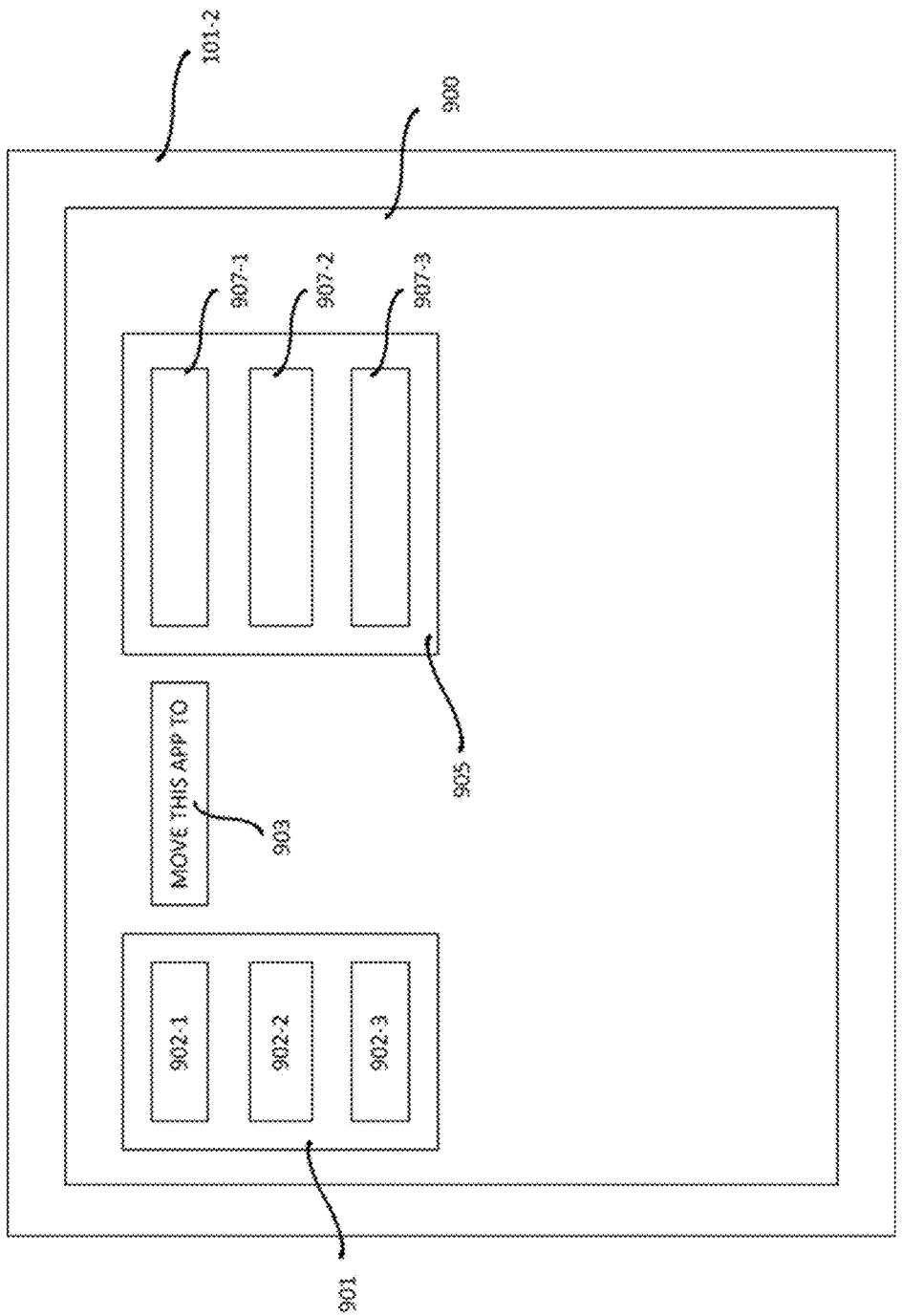
FIG. 9A illustrates an example embodiment of a graphical user interface (GUI) for a push-based application migration.
Figure 9B:
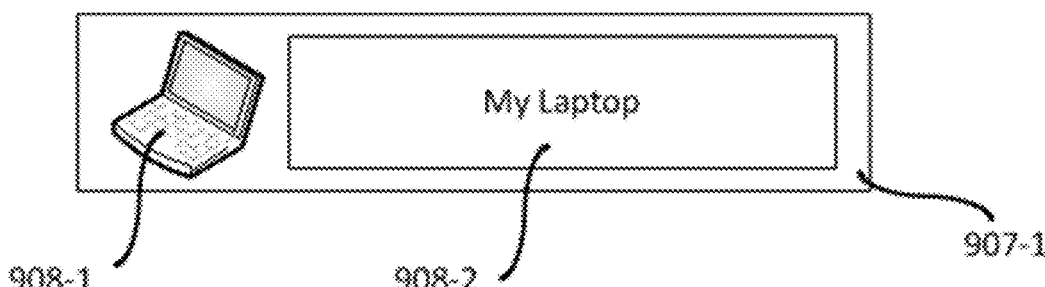
FIG. 9B illustrates an example embodiment of a GUI item corresponding to a user device for a push-based application migration.

As explained above, the OS 214 supports migration of running applications between OS instances running on different user devices. In some embodiments, migration is performed using a "push"-based technique, that is, where migration is initiated at a source user device, and an application is then pushed from the source device to a destination user device. In further embodiments, a GUI is generated on a source user device to allow the user to select an application for migration, and the destination user device to which the application will be migrated to. An exemplary illustration is shown in FIG. 9A. In FIG. 9A, GUI 900 shows a list of running applications 901 on the source user device 101-2. List of running applications 901 has entries 902-1 to 902-3, each corresponding to a running application. When any of these entries are selected, an option is presented to the user to enable the user to decide which destination device the application is to be migrated to. As shown in FIG. 9A, when an entry such as entry 902-1 is selected, option 903 with the prompt "MOVE THIS APP TO" is presented to the user, along with a list of connected user devices 905. List 905 comprises, for example, items 907-1 to 907-3, wherein each item corresponds to one of other user devices 101-3, 101-4 and 101-5 currently connected to the device interoperability system 200. In some embodiments, each item consists of an icon representing the type of the user device and the device name. For example, item 907-1 corresponds to user device 101-3 which is a laptop. An exemplary illustration of item 907-1 is shown in FIG. 9B. In FIG. 9B item 907-1 comprises icon 908-1 to represent a laptop, and name label 908-2 comprising, for example, "My Laptop".

Figure 10A:
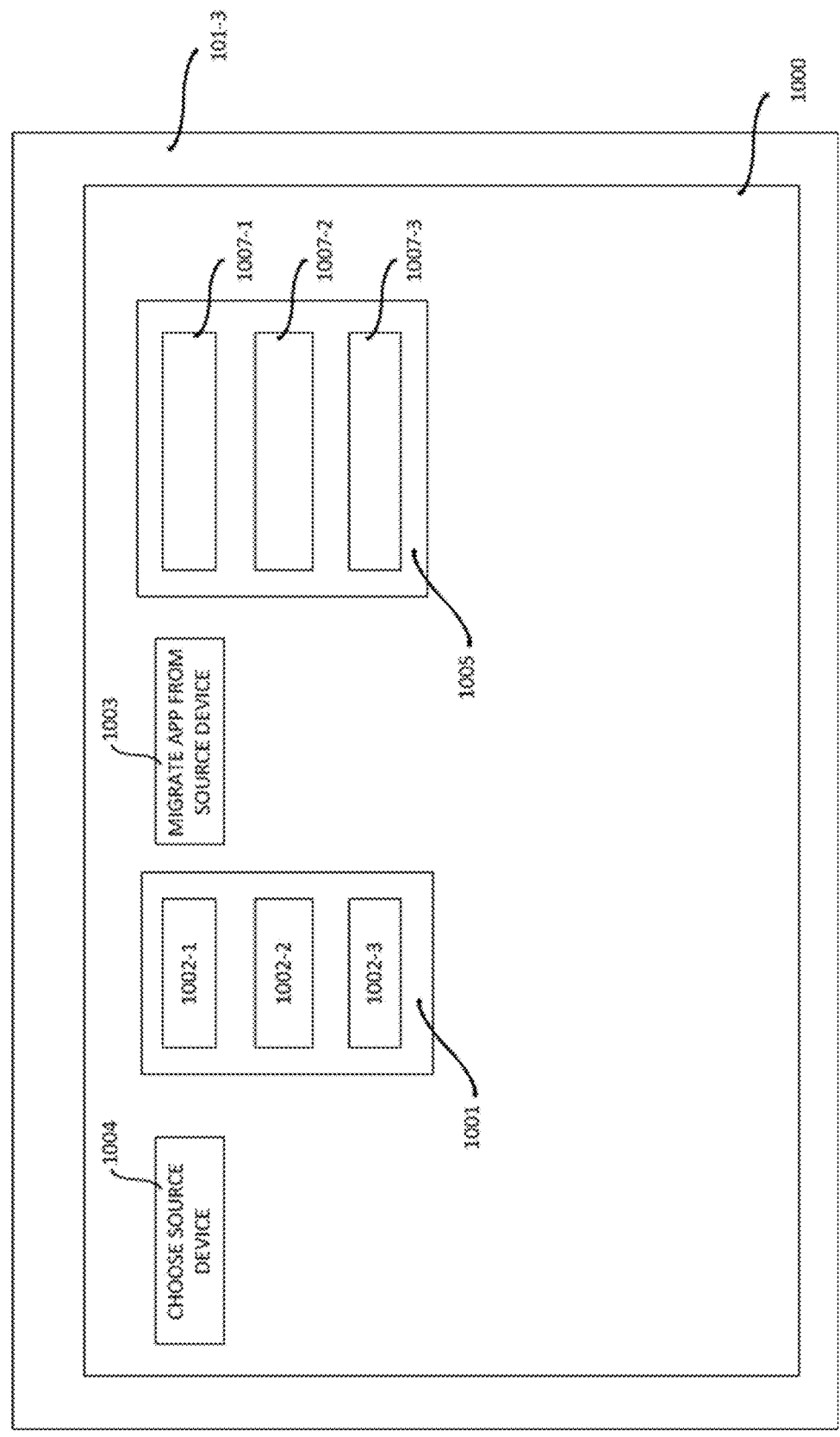
FIG. 10A illustrates an example embodiment of a GUI for a pull-based application migration.
Figure 10B:
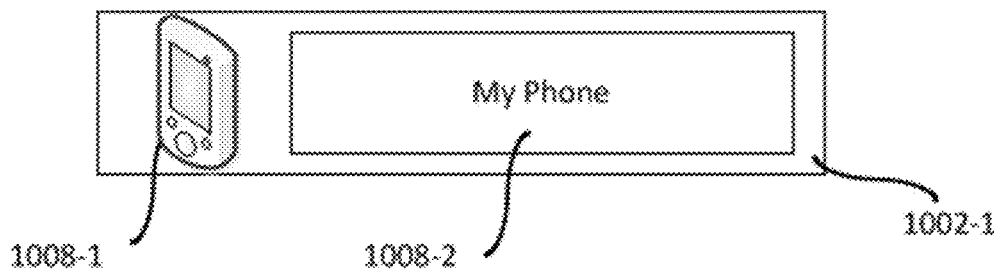
FIG. 10B illustrates an example embodiment of a GUI item corresponding to a user device for a pull-based application migration.

In some embodiments, migration is performed using a "pull"-based technique, that is, where migration is initiated at the destination user device, and an application is then pulled from a source user device for migration to the destination user device. In further embodiments, a GUI is generated on a destination user device to allow the user to select a source user device where an application will be migrated from, and an application for migration. An exemplary illustration is shown in FIG. 10A. In FIG. 10A, GUI 1000 presents an option 1004 with the prompt "CHOOSE A DEVICE", along with a list of source devices 1001. List of source user devices 1001 has entries 1002-1 to 1002-3, corresponding to source user devices 101-2, 101-4 and 101-5 connected to device interoperability system 200. In some embodiments, each entry comprises an icon representing the type of the user device and the device name. For example, entry 1002-1 corresponds to user device 101-2 which is a smartphone. An exemplary illustration of entry 1002-1 is shown in FIG. 10B. In FIG. 10B entry 1002-1 comprises icon 1008-1 to represent a phone, and name label 1008-2 comprising, for example, "My Phone". When any of these entries are selected, an option is presented to the user to enable the user to decide which running application should be migrated from the selected source user device. As shown in FIG. 10A, when an entry such as entry 1002-1 is selected, option 1003 with the prompt "MIGRATE APP FROM OTHER DEVICE" is presented to the user, along with a list of applications 1005 running on user device 101-2. List 1005 comprises, for example, items 1007-1 to 1007-3, wherein each item corresponds to one of the applications which are running on source user device 101-2.

The above described embodiments also enable privacy-preserving artificial intelligence (AI) or machine learning (ML), as will be described below. Currently, many AI or ML systems use centralized learning, where data is transmitted from user devices to a centralized database connected to centralized servers. The servers perform the training of the AI or ML model parameters, and validation of the model parameters. Therefore, the learning is performed in a centralized location.

This poses privacy and security concerns. A centralized database with data from a large amount of users is a very attractive target to criminals. Furthermore, data stored in a centralized database can be used for unintended purposes or by people who are not authorized to view or use that data. Encryption has been proposed as a solution to reduce the privacy and security concerns. However, in the case of large data sets, encryption may be difficult or time consuming. Another privacy and security related issue revolves around data sovereignty. These issues may arise if data is entrusted to a party which is subject to the laws of a foreign country, and therefore an agency in that foreign country could leverage the laws of that foreign country and force the party to turn over the data to that agency.

Furthermore, if the data sets are large, problems are posed if the connections between the user devices and the centralized database are slow, limited or intermittent. Additionally, it has been shown that transmission of large data sets to centralized databases, such as cloud storage, consume more energy and may therefore lead to higher levels of carbon emissions.

Privacy-preserving AI or ML allows for the training of AI and ML models where the user data is not stored in the centralized database. In this way, the privacy of user data is preserved as the user data resides within the control of the user.

Privacy preserving AI or ML addresses some of the concerns with centralized learning. The lack of aggregation in a centralized database reduces the attractiveness to criminals, as explained above. Also, since the data resides within the control of the user, this reduces the possibility of misuse for the wrong purposes, or by the wrong people. It could also mitigate issues around data sovereignty, since data resides within the control of the user. Furthermore, the connectivity requirements are reduced, since the user data is not transmitted to the centralized database. It is also easier to encrypt model parameters since these are typically smaller than the size of a user data set.

One privacy preserving AI or ML approach known to those of skill in the art is federated learning. In federated learning, model computation is performed on the user device, using the data stored on the user device, so as to obtain a subset of model parameters. The subsets of model parameters are transmitted to a centralized database, where they are aggregated with subsets of model parameters obtained from other user devices to form an overall set of model parameters. The overall set of model parameters is returned to the user.

Federated learning provides the advantages of privacy preserving AI or ML, but also has some drawbacks. For example, the size of the data set provided by a single user device may not be large enough to provide sufficiently optimal model parameters.

Data collected by each user device may be different due to the use of these different devices to perform different tasks. For example, users tend to use laptops for processor intensive tasks that require large displays and keyboards. Examples of such tasks include word processing and spreadsheets. Users tend to use smartphones, tablets and smartwatches for mobile "on the go" tasks such as instant messaging, social media or collecting movement data. Therefore, the data set may not be sufficiently diverse, that is, the data set may not have enough information with regard to certain features to provide sufficiently optimal model parameters. For example, data held on a mobile device may not have enough information with regard to features connected to the performance of processor intensive tasks. Data created on relatively static devices may not have enough information with regard to features related to user mobility. Data created on devices used for entertainment may not have enough information with regard to features related to work-related tasks performed by a user. Therefore, the lack of size and diversity in data sets provided by a single device, may mean that models trained using data sets provided by a single device are sub-optimal.

Due to the difference in processing power and hardware capabilities of each user device, or the bandwidth of connections between user devices and the centralized database, this may lead to issues as some devices may become "stragglers", that is, some devices may lag behind the others in performing model computations.

In addition to stragglers, some user devices may not have at least one of the storage capacity and processing power to perform the computations necessary for AI or ML models. Furthermore, if the device's power supply is limited, the computations may impose an unnecessary burden on the power available to the device.

Furthermore, in some cases, even though a user device may have the storage capacity, processing power and power supply to perform AI or ML model computations, the user device may need to dedicate its resources to performing other tasks due to, for example, safety reasons or mission-critical nature. For example, a user may not want a medical device such as a magnetic resonance imaging device to perform AI or ML model computations while performing medical tests. Similarly, a user may want a device for home security to focus fully on home security, and not perform AI or ML model computations.

Additionally, the cost to a user of having to upgrade all of their devices to versions which have sufficient processing capabilities to perform AI or ML model computations may be prohibitive.

The following describes a decentralized and privacy-preserving AI or ML implementation which uses the previously described embodiments, and is described with reference to FIGS. 2, 2B, 2C, 11, 11B and 12. The previously described embodiments allow the user to share and synchronize data securely in a more private manner, while mitigating the impact of limited connectivity and each user device running different OSes and different platforms. The decentralized AI or ML implementations described below enable the application of AI and ML functionality in a privacy-preserving manner, and deliver the advantages of the previously described embodiments.

Previously, embodiments of hierarchical or differentiated systems of secure storage for user data were described above with reference to FIGS. 5 and 6. In some of these embodiments, the data may be so sensitive that it cannot be stored in the cloud, and must be stored within the device interoperability system 200. For these embodiments, the privacy preserving decentralized AI or ML implementations described below enable the implementation of AI or ML using highly sensitive data from a plurality of users, yet preserve the privacy and security of this highly sensitive data.

Figure 11:
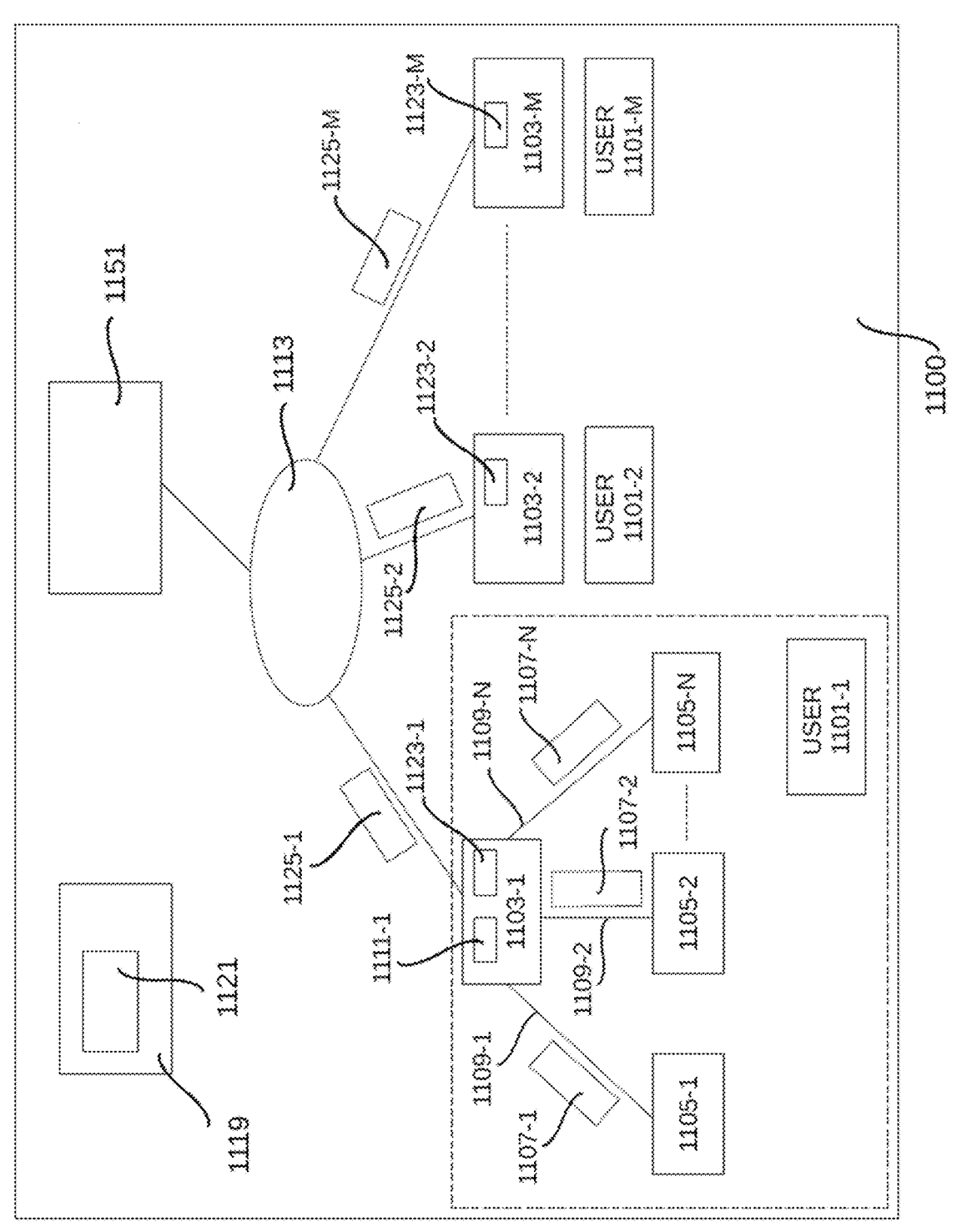
FIG. 11 illustrates an example embodiment of a system for privacy preserving artificial intelligence (AI) or machine learning (ML).

FIG. 11 shows an example embodiment of a system 1100 for a privacy preserving decentralized AI or ML implementation. In FIG. 11 each of the users 1101-1 to 1101-M has an associated device interoperability system 1103-1 to 1103-M. Each of device interoperability system 1103-1 to 1103-M is similar to device interoperability system 200 of FIG. 2. Each device interoperability system is communicatively coupled to one or more user devices. For example, device interoperability system 1103-1 is communicatively coupled to one or more user devices 1105-1 to 1105-N via connections 1109-1 to 1109-N.

Each of the device interoperability systems 1103-1 to 1103-M are coupled to artificial intelligence analysis subsystem 1151 via interconnections 1113.

Interconnections 1113 perform the function of communicatively coupling artificial intelligence analysis subsystem 1151 with device interoperability systems 1103-1 to 1103-M. Interconnections 1113 may be implemented in a variety of ways. For example, in some embodiments, interconnections 1113 comprise one or more networks. In some of these embodiments, one or more of these one or more networks comprise one or more sub-networks. The one or more networks comprise, for example, wireless networks, wired networks, Ethernet networks, local area networks, metropolitan area networks and optical networks. In some embodiments, the one or more networks comprise at least one of a private network such as a virtual private network, or a public network such as the Internet. In some embodiments, interconnections 1113 also comprise one or more direct connections. Various wired or wireless communications protocols known to those of skill in the art may be used to implement interconnections 1113. These include, for example, near field communications (NFC), Wi-Fi, BLUETOOTH®, Radio Frequency Identification (RFID), 3G, Long Term Evolution (LTE), 5G and Universal Serial Bus (USB).

Figure 11B:
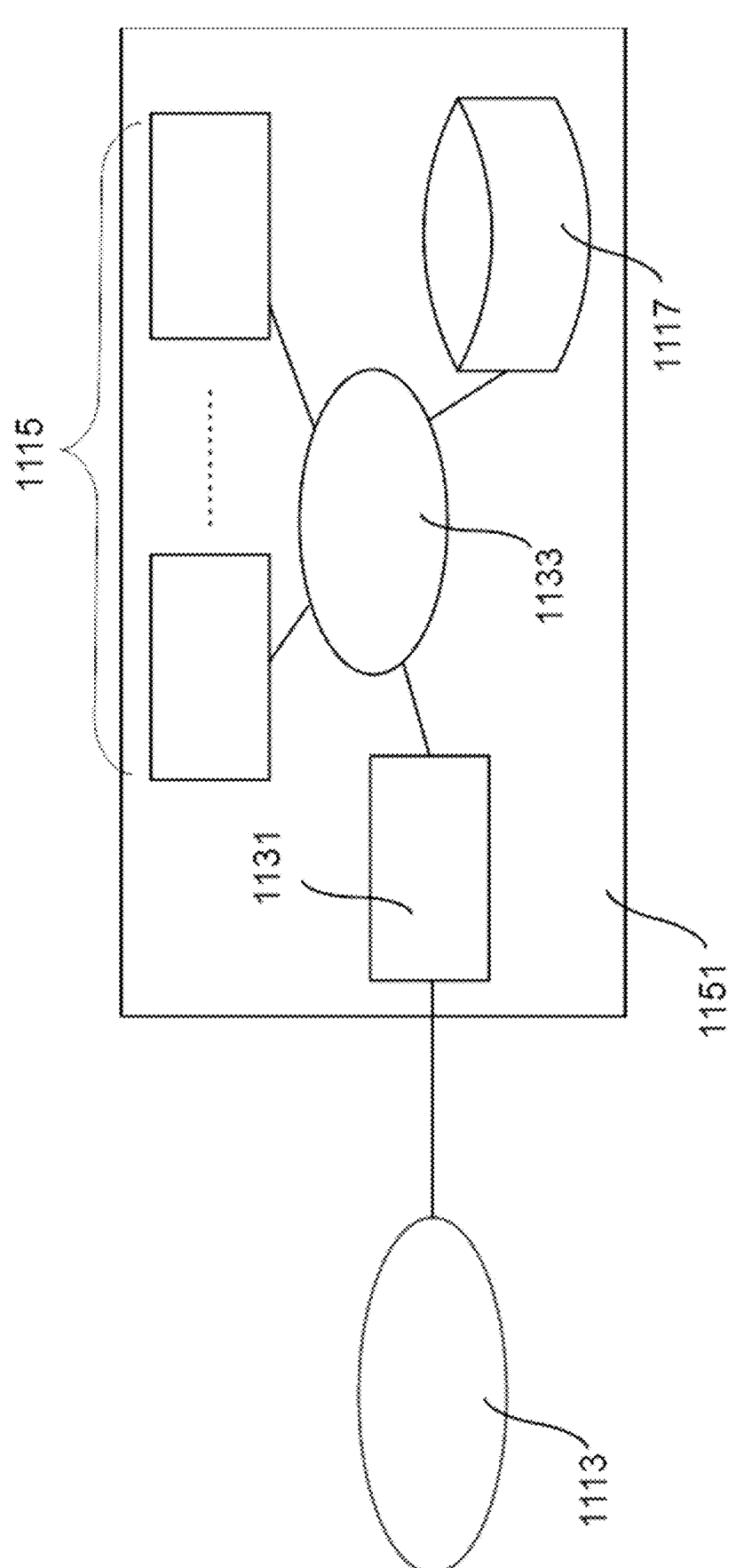
FIG. 11B illustrates an example embodiment of an artificial intelligence analysis subsystem.

An example embodiment of artificial intelligence analysis subsystem 1151 is shown in FIG. 11B. Analysis subsystem interconnection 1133 connects the various components of artificial intelligence analysis subsystem 1151 to each other. In one embodiment, interconnection 1133 is implemented using, for example, network technologies known to those in the art. These include, for example, wireless networks, wired networks, Ethernet networks, local area networks, metropolitan area networks and optical networks. In one embodiment, interconnection 1133 comprises one or more subnetworks. In another embodiment, interconnection 1133 comprises other technologies to connect multiple components to each other including but not limited to buses, coaxial cables, USB connections, routers, servers and optical cables.

Communications subsystem 1131 enables the components of artificial intelligence analysis subsystem 1151 to communicatively couple with interconnections 1113, so that the components receive information from and transmit information to interconnections 1113. Communications subsystem 1131 interacts with interconnections 1113 using, for example, wired or wireless communications protocols, devices and components known to those of skill in the art.

Database 1117 stores information for use by artificial intelligence analysis subsystem 1151. In some embodiments, database 1117 further comprises a database server. The database server receives one or more commands from, for example, one or more servers 1115 and translates these commands into appropriate database language commands to retrieve information from, and store information into database 1117. In some embodiments, database 1117 is implemented using one or more database languages known to those of skill in the art, including, for example, Structured Query Language (SQL). In some other embodiments, database 1117 stores subsets of model parameters for a plurality of users. Then, there may be a need to keep the subsets of model parameters related to each user, separate from the subsets of model parameters or data related to the subsets of model parameters of the other users. To achieve this, in some embodiments, database 1117 is partitioned so that subsets of model parameters related to each user is separate from the subsets of model parameters related to the other users. In some embodiments, each user has an account with a login and a password or other appropriate security measures to ensure no unauthorized access of their subsets of model parameters or data related to subsets of model parameters. This is useful if, for example, an administrator of such a system wants to improve explainability and transparency of the AI or ML model to the user. This way, the user can login into their account and view the subsets of model parameters or data related to the subsets of model parameters. It also provides further assurance to users of the privacy and security of the overall system. In further embodiments, when subsets of model parameters are entered into database 1117, associated metadata is added so as to make it more easily searchable. In further embodiments, the associated metadata comprises one or more tags. In some other embodiments, database 1117 presents an interface to enable the entering of search queries. In some embodiments, the subsets of model parameters stored within database 1117 are encrypted for security reasons. In further embodiments, other privacy-enhancing data security techniques are employed to protect database 1117. In yet other embodiments, database 1117 is implemented within the context of a data centre.

One or more processing subsystems 1115 perform processing and analysis within artificial intelligence analysis subsystem 1151 using one or more algorithms and programs residing on artificial intelligence analysis subsystem 1151; data received from interconnections 1113 via communications subsystem 1131 and one or more portions of information retrieved from database 1117. The algorithms and programs are stored in, for example:

database 1117 as explained above, or within one or more processing subsystems 1115.

Examples of operations performed or facilitated by one or more processing subsystems 1115 comprise:

determination of the objectives of the AI or ML task and data requirements of the task. Examples of AI or ML task objectives include:

Predicting accurately the next word that a user will use on the user's device,

Improving accuracy of diagnoses of a disease, and

Minimizing default probability while ensuring fairness in approving credit applications of borrowers;

determination of the AI or ML model to be used;

selection of one or more of device interoperability systems 1103-1 to 1103-M to perform AI model computation;

transmitting an initial set of model parameters to one or more of the device interoperability systems 1103-1 to 1103-M;

providing interfaces to enable, for example, an administrator to create one or more programs for model computations and "cleaning" operations, examples of which will be provided further below;

transmitting one or more programs to perform model computations based on the determined AI or ML model, where in some embodiments these programs are created by an administrator using the interfaces described above;

transmitting one or more programs to perform "cleaning" operations, where in some embodiments, the "cleaning" operations are based on the determined AI or ML model, where in some embodiments these programs are created by an administrator using the interfaces described above;

transmitting a set of model parameters 1121 to enable one or more of device interoperability systems 1103-1 to 1103-M to perform model computations, as will be described below;

creating model parameters 1121 based on the information 1125-1 to 1125-M received from the device interoperability systems 1103-1 to 1103-M as will be described below; and transmitting the created model parameters 1121 back to the one or more device interoperability systems 1103-1 to 1103-M.

Various implementations are possible for artificial intelligence analysis subsystem 1151 and its components. In some embodiments, artificial intelligence analysis subsystem 1151 is implemented using a cloud-based approach. In other embodiments, artificial intelligence analysis subsystem 1151 is implemented across one or more facilities, where each of the components are located in different facilities and interconnections 1133 are then based on networks. In other embodiments, artificial intelligence analysis subsystem 1151 is implemented within a single server or computer. In yet other embodiments, artificial intelligence analysis subsystem 1151 is implemented across multiple servers or computers. In yet other embodiments, artificial intelligence analysis subsystem 1151 is implemented in software. In other embodiments, artificial intelligence analysis subsystem 1151 is implemented using a combination of software and hardware.

An example AI or ML model is model 1119 comprising model parameters 1121, as shown in FIG. 11. As explained above, in some embodiments the selection of the AI or ML model 1119 and model parameters 1121 to be used is facilitated by one or more processing subsystems 1115. The AI or ML model 1119 is based on models known to those of skill in the art. Examples of such models comprise decision trees, artificial neural networks, convolutional neural networks, linear support vector machines, deep learning models, deep neural network models, linear regression models, and logistic regression models.

Figure 12:
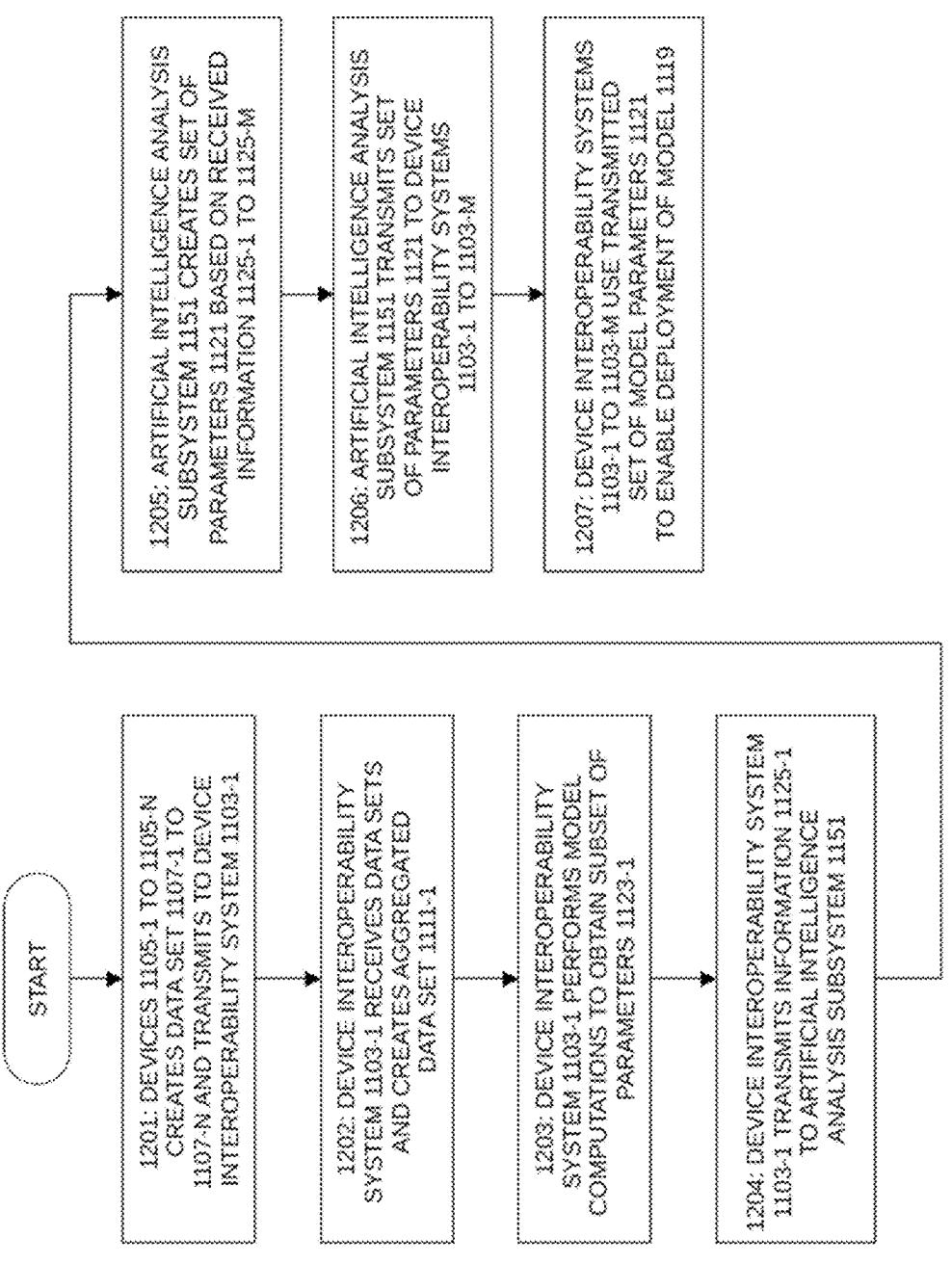
FIG. 12 illustrates an example embodiment of operation for privacy preserving AI or ML.

An example embodiment of operation of this system is described with reference to FIGS. 11, 11B and FIG. 12. In step 1201, the user devices connected to one or more of the device interoperability systems 1103-1 to 1103-M create data sets and transmit the created data sets to the device interoperability system. For example, each of these user devices 1105-1 to 1105-N creates a corresponding data set 1107-1 to 1107-N. Since users utilize different devices for different reasons and tasks, it is unlikely that the data sets 1105-1 to 1105-N created at each of these devices will overlap with each other. Each of these user devices 1105-1 to 1105-N transmits a corresponding created data set 1107-1 to 1107-N to device interoperability system 1103-1 via connections 1109-1 to 1109-N.

In step 1202, one or more of device interoperability systems 1103-1 to 1103-M receive the created data sets from coupled user devices and creates an aggregated data set based on the received created data set. In some embodiments, the one or more of the device interoperability systems which create the aggregated data set are selected by one or more processing subsystems 1115 in artificial intelligence analysis subsystem 1151 based on, for example:

the availability of a connection of a device interoperability system to artificial intelligence analysis subsystem 1151;

the bandwidth of a connection from a device interoperability system to artificial intelligence analysis subsystem 1151;

the utilization of a device interoperability system;

the utilization of a device that a device interoperability system is installed on, or integrated into the device, in embodiments where a device interoperability system is installed on, or integrated into a device;

the processing capabilities of the device that the interoperability system is installed on, and the availability of power to a device interoperability system determined based on, for example, the charge level or the total capacity of a power source such as battery 211 in FIG. 2C in embodiments where a device interoperability system is installed on, or integrated into a device, or whether the device interoperability system is connected to a mains power source; and user inputs, for example, if a user enters commands via a prompt or an interface not to allow the device interoperability system to be used in this manner.

An example of the performance of step 1202 on one of the device interoperability systems is as follows: Device interoperability system 1103-1 receives the created data sets 1107-1 to 1107-N and creates an aggregated data set 1111-1 based on the received created data sets. In some embodiments, aggregated data set 1111-1 is created based on received data sets 1107-1 to 1107-N and other data stored in a storage of device interoperability system 1103-1. In some embodiments, the creation of the aggregated data set 1111-1 includes "cleaning" the data sets, that is, preparing the data sets for subsequent steps. Examples of cleaning operations include pre-processing of the received data sets, detecting bias in the received data sets, removing detected bias and post-processing of the aggregated data set 1111-1. An example of pre-processing of the received data sets is performing appropriate normalization operations on the received data sets. The aggregated data set 1111-1 is stored in a storage of device interoperability system 1103-1, similar to storage 212 of device interoperability system 200 as shown in FIG. 2B. In some embodiments, device interoperability system 1103-1 has one or more processors and programmes similar to the one or more processors 215 and programmes 216 shown in FIG. 2B. Then, these one or more processors in combination with the programmes stored on device interoperability system 1103-1 are then used to perform cleaning operations. As explained above, in some embodiments, the programmes used to perform cleaning operations are provided by the one or more servers 1115. Since the data sets collected from devices 1105-1 to 1105-N are likely to be diverse in nature, the aggregated data set 1111-1 may provide stronger predictive capabilities compared to each of the individual data sets 1107-1 to 1107-N. Furthermore, the aggregated data set 1111-1 is likely to be larger than each of the individual data sets 1107-1 to 1107-N, which could potentially lead to more accurate models.

In step 1203, one or more of device interoperability systems 1103-1 to 1103-M performs AI or ML model computations based on the aggregated data set to determine one or more subsets of model parameters 1123-1 to 1123-M to achieve the one or more objectives related to AI or ML model 1119. In the embodiments where one or more of device interoperability systems 1103-1 to 1103-M is selected to perform step 1202, the selected one or more device interoperability systems 1103-1 to 1103-M perform AI or ML model computations to determine corresponding one or more subsets of model parameters 1123-1 to 1123-M. In some embodiments, the one or more servers 1115 within artificial intelligence analysis subsystem 1151 discloses the AI or ML model 1119, an initial set of model parameters 1121 related to model 1119 and objectives of the AI and ML model 1119 to the selected one or more device interoperability systems 1103-1 to 1103-M, prior to performing step 1203. In some embodiments, the one or more servers 1115 within artificial intelligence analysis subsystem 1151 provide programmes for model computation as explained above, prior to step 1203. Examples of AI and ML model computations performed comprise one or more computations related to training, testing, validation and cross-validation, and relevant to the AI and ML model 1119.

For example: Device interoperability system 1103-1 performs AI or ML model 1119 computation using the aggregated data set 1111-1. In some embodiments, the device interoperability system 1103-1 has one or more processors and programmes similar to the one or more processors 215 and programmes 216 shown in FIG. 2B. Then, these one or more processors in combination with the programmes stored on device interoperability system 1103-1 are then used to perform AI or ML model computation with the aggregated data set 1111-1 to determine subset of model parameters 1123-1, so as to achieve the one or more objectives related to AI or ML model 1119.

In some embodiments, at least some of the model computations are performed by a selected one or more of the one or more other devices 1105-1 to 1105-N, as these selected devices may have more processing power or storage capability or both. In other embodiments, as explained above, in some embodiments, device interoperability system 1103-1 is either integrated into or installed as an app on one of devices 1105-1 to 1105-N. For example, device interoperability system 1103-1 is integrated into or installed as an app on device 1105-1. Then, in some of these embodiments, one or more of devices 1105-2 to 1105-N are selected and used to perform at least some of the model computations, as the selected one or more devices may have more processing power or storage capacity. In some of the embodiments where a plurality of devices is used to perform AI or ML model computations, distributed machine learning techniques known to those of skill in the art are used so as to distribute the workload of AI or ML model computation efficiently across the plurality of devices.

In step 1204, one or more of device interoperability systems 1103-1 to 1103-M creates information based on the model parameters determined in step 1203, then transmits this information to artificial intelligence analysis subsystem 1151 via one or more connections set up via interconnections 1113. In the embodiments where one or more of device interoperability systems 1103-1 to 1103-M is selected to perform step 1202 and step 1203, the selected one or more device interoperability systems 1103-1 to 1103-M creates information 1125-1 to 1125-M based on the subsets of model parameters determined in step 1203, then transmits this information to artificial intelligence analysis subsystem 1151.

For example: Device interoperability system 1103-1 creates then transmits information 1125-1 based on the determined subsets of model parameters 1123-1 to artificial intelligence analysis subsystem 1151 via a connection set up via interconnections 1113. One or more of the other device interoperability systems do the same as well. For example, referring to FIG. 11, device interoperability system 1103-2 creates then transmits information based on subset of model parameters 1125-2 to artificial intelligence analysis subsystem 1151 via a connection set up via interconnections 1113.

Information 1125-1 to 1125-M comprises, for example, updates to the determined subsets of model parameters 1123-1 to 1123-M from a previous time that training was performed. For example, if the subset of model parameters 1123-1 from a previous time that training was performed is the vector [3, 2], and the subset of model parameters 1123-1 from the current time is the vector [4, 3], then the difference is [1, 1]. The update comprising this difference is transmitted to artificial intelligence analysis subsystem 1151 as part of information 1125-1. In other embodiments, information 1125-1 to 1125-M comprises the subsets of model parameters 1123-1 to 1123-M themselves. So from the example above, the subset of model parameters from the current time is vector [4, 3]. Then information 1125-1 comprises vector [4, 3].

In some embodiments, the one or more transmissions occur over at least one of:

authenticated one or more connections set up via interconnections 1113, private one or more connections set up via interconnections 1113, and encrypted one or more connections set up via interconnections 1113.

In some embodiments, the one or more of the device interoperability systems 1103-1 to 1103-M which transmit one or more of information 1125-1 to 1125-M encrypt the information before transmission to artificial intelligence analysis subsystem 1151. In some of these embodiments, prior to encryption of the information 1125-1 to 1125-M, a differential privacy mechanism is used to add an appropriate amount of noise to the information 1125-1 to 1125-M to further improve privacy. In further embodiments, homomorphic encryption is used to encrypt the information prior to transmission. In yet other embodiments, step 1204 occurs in response to a request or query sent by artificial intelligence analysis subsystem 1151. In some embodiments, techniques to reduce the size of information 1125-1 to 1125-M are used so as to reduce the amount of information transmitted to artificial intelligence analysis subsystem 1151. In some embodiments, compression techniques are used to reduce size of information 1125-1 to 1125-M. In other embodiments, the techniques used are based on, for example, structured updates and sketched updates, as described in Sections 2 and 3 of "Federated learning: Strategies for improving communication efficiency" by Konecný J, McMahan H B, Yu F X, Richtárik P, Suresh A T, and Bacon D, arXiv preprint arXiv:1610.05492, published on Oct. 18, 2016.

In step 1205, artificial intelligence analysis subsystem 1151 creates a set of model parameters 1121 for model 1119 based on the information 1125-1 to 1125-M received from each user. In some embodiments, this is performed as follows: Communications subsystem 1131 receives the one or more of the information 1125-1 to 1125-M from device interoperability systems 1103-1 to 1103-M, and transmits the received information to, for example, database 1117 via interconnections 1133. Then, one or more processing subsystems 1115 retrieves the stored information from database 1117 via interconnections 1133, and creates set of parameters 1121 based on the information 1125-1 to 1125-M. In some of the embodiments where the information is encrypted, one or more processing subsystems 1115 performs decryption prior to processing. In embodiments where the information 1125-1 to 1125-M was compressed prior to transmission, the information is first decompressed by one or more servers 1115. In some embodiments, after the set of parameters 1121 has been created, information 1125-1 to 1125-M is deleted from database 1117 to ensure privacy and security.

The creation of the set of model parameters 1121 is performed using one or more techniques known to those of skill in the art. In some embodiments, the creation of the set of model parameters 1121 comprises the use of aggregation techniques. In some embodiments, the aggregation techniques are based on, for example, the Federated Averaging algorithm as demonstrated in "Communication-efficient learning of deep networks from decentralized data" by McMahan, B., Moore, E., Ramage, D., Hampson, S. and y Arcas, B. A., in pp. 1273-1282 of Artificial Intelligence and Statistics, PMLR, published on Apr. 10, 2017. In other embodiments, the aggregation techniques are based on secure aggregation algorithms. Examples of such secure aggregation algorithms are described in "Practical secure aggregation for privacy-preserving machine learning" by Bonawitz K, Ivanov V, Kreuter B, Marcedone A, McMahan H B, Patel S, Ramage D, Segal A, Seth K. in pp. 1175-1191 of the Proceedings of the 2017 ACM SIGSAC Conference on Computer and Communications Security, published on Oct. 30, 2017.

In step 1206, artificial intelligence analysis subsystem 1151 transmits the set of model parameters 1121 to one or more of device interoperability systems 1103-1 to 1103-M. In some embodiments, this is performed as follows: One or more processing subsystems 1115 transmits set of parameters 1121 in database 1117 via interconnections 1133, communications subsystems 1131 and interconnections 1113. In some embodiments, the set of model parameters 1121 is also stored in database 1117.

In step 1207, the transmitted set of model parameters 1121 is used by one or more device interoperability systems 1103-1 to 1103-M to deploy AI or ML model 1119. In some embodiments, the deployment comprises a device interoperability system transmitting the model parameters and AI or ML model to coupled devices to enable calculations to be performed using the models. For example, device interoperability system 1103-1 transmits the model parameters and the AI model to device 1105-1, to enable device 1105-1 to perform calculations so as to enable deployment. In other embodiments, the deployment comprises a device interoperability system performing calculations using the model parameters and AI model so as to enable deployment, and transmitting the results to a device. For example, device interoperability system 1103-1 uses the transmitted set of model parameters 1121 to perform calculations so as to enable deployment of model 1119, and then transmits the results to device 1105-2. This is useful for devices which are power-limited, processing capability-limited or storage-limited. In some embodiments, the device interoperability system 1103-1 determines whether to transmit the model parameters and the AI model to a device; or perform calculations using the model parameters and AI model then transmit the results of these calculations to the device, based on one or more of power, processing capability, connectivity and storage limitations of the device.

The above is presented as an example of a decentralized AI or ML architecture which is privacy-preserving. The above embodiments can be built using a framework. In some embodiments, the above is built using a framework based on TensorFlow, such as TensorFlow Federated, as explained in "TensorFlow: Federated Learning", retrieved from https://www.tensorflow.org/federated/federated learning?h1=en on Mar. 23, 2021. In other embodiments, the above is built using a framework based on PyTorch, for example, the PySyft framework as explained in "A generic framework for privacy preserving deep learning" by Ryffel T, Trask A, Dahl M, Wagner B, Mancuso J, Rueckert D, Passerat-Palmbach J. arXiv preprint arXiv:1811.04017 published on Nov. 13, 2018. In other embodiments, the above is built using a framework based on Federated AI Technology Enabler (FATE), as explained in "FedAI Ecosystem: About", retrieved from https://www.fedai.org/about/ on Mar. 23, 2021.

Variants to the above are also possible. For example, in some embodiments the one or more device interoperability systems 1103-1 to 1103-M perform steps 1202-1204 during times of low activity. In some of the embodiments where a device interoperability system is installed on a device, or integrated into a device, the performing of steps 1202-1204 is based on the utilization of the device. In further embodiments, device interoperability systems 1103-1 to 1103-M schedule transmission of information 1125-1 to 1125-M based on available bandwidth for connections to artificial intelligence analysis subsystem 1151. In yet other embodiments, device interoperability systems 1103-1 to 1103-M schedule transmission of information 1125-1 to 1125-M to artificial intelligence analysis subsystem 1151, based on, for example, the availability of power measured by, for example, the charge level or the total capacity of a power source such as battery 211 in FIG. 2C.

The above-described embodiments assist in preserving the privacy of data held by users 1101-1 to 1101-M. Since each device interoperability system 1103-1 to 1103-M is controlled by each of users 1101-1 to 1101-M, consequently the data stays within the user's control. Importantly, it is never held in a centralized database or processed by a centralized server. Furthermore, the above described embodiments enable the implementation of privacy-preserving AI or ML for devices which are processing-capability-limited, power-limited, storage-limited, or may not be able to otherwise perform AI or ML model computation. The above-described embodiments may also reduce the bandwidth requirement of transmitting large data sets. Furthermore, as explained before, transmitting large data sets may lead to higher energy consumption and potentially carbon emissions. By avoiding the need to transmit large data sets, this may improve future sustainability.

One of skill in the art would realize that the above described embodiments can be implemented in a variety of settings, for example, smart homes, smart factories, hospitals and so on.

As explained previously, the privacy preserving decentralized AI or ML implementations described above enable the implementation of AI or ML using highly sensitive data from a plurality of users, yet preserve the privacy and security of this highly sensitive data. This is potentially useful in a smart home or smart factory setting, where highly sensitive data such as trade secrets which may not be suited to cloud storage are generated.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for privacy preserving artificial intelligence (AI) or machine learning (ML) comprising:
a first device interoperability system communicatively coupled to a first plurality of user devices via a first plurality of connections,
a second device interoperability system communicatively coupled to a second plurality of user devices via a second plurality of connections, and
the first device interoperability system and the second device interoperability system are communicatively coupled to an artificial intelligence analysis subsystem via one or more interconnections, further wherein:
the first device interoperability system receives a first plurality of data sets from the first plurality of user devices via the first plurality of connections,
the second device interoperability system receives a second plurality of data sets from the second plurality of user devices via the second plurality of connections,
the first device interoperability system creates a first aggregated data set based on the received first plurality of data sets,
the second device interoperability system creates a second aggregated data set based on the received second plurality of data sets,
the first device interoperability system determines a first subset of model parameters for an AI or ML model based on the first aggregated data set wherein:
the determination of the first subset of model parameters comprises performing one or more model computations,
the second device interoperability system determines a second subset of model parameters for the AI or ML model based on the second aggregated data set,
the first device interoperability system transmits a first set of information based on the first subset of model parameters to the artificial intelligence analysis subsystem, the second device interoperability system transmits a second set of information based on the second subset of model parameters to the artificial intelligence analysis subsystem,
the artificial intelligence analysis subsystem creates a set of model parameters associated with the AI or ML model based on the transmitted first and second sets of information,
the artificial intelligence analysis subsystem transmits the set of model parameters to the first and second device interoperability systems, and
at least one of the first and second device interoperability systems deploy the AI or ML model based on the set of model parameters.

2. The system of claim 1, wherein the first and the second device interoperability systems are selected from one or more device interoperability systems based on one or more criteria, and
the one or more device interoperability systems are communicatively coupled to the artificial intelligence analysis subsystem via the one or more interconnections.

3. The system of claim 2, wherein the one or more criteria comprises at least one of:
one or more availabilities related to the one or more interconnections to the artificial intelligence analysis subsystem;
one or more bandwidths related to the one or more interconnections to the artificial intelligence analysis subsystem;
one or more utilizations of the one or more device interoperability systems;
one or more processing capabilities available to the one or more device interoperability systems; and
one or more availabilities of power to the one or more device interoperability systems.

4. The system of claim 1, wherein the creation of the set of model parameters comprises the use of one or more aggregation techniques.

5. The system of claim 1, wherein the one or more model computations comprises at least one computation related to one or more of training, testing, validation and cross-validation.

6. The system of claim 1, wherein at least one of the first plurality of devices or the second plurality of devices comprise one or more of:
an industrial device,
a consumer Internet of Things (IoT) device, and
a smart device, wherein the smart device comprises at least one of:
a vehicle,
a medical device,
a kitchen appliance,
an air-conditioning device, and
a smart home device.

7. A method for privacy preserving artificial intelligence (AI) or machine learning (ML) comprising:
providing one or more device interoperability systems communicatively coupled to an artificial intelligence analysis subsystem via one or more interconnections, wherein the one or more device interoperability systems comprise:
a first device interoperability system communicatively coupled to a first plurality of user devices via a first plurality of connections, and a second device interoperability system communicatively coupled to a second plurality of user devices via a second plurality of connections;

further wherein:

the first device interoperability system receives a first plurality of data sets from the first plurality of user devices via the first plurality of connections, the second device interoperability system receives a second plurality of data sets from the second plurality of user devices via the second plurality of connections, the first device interoperability system creates a first aggregated data set based on the received first plurality of data sets, the second device interoperability system creates a second aggregated data set based on the received second plurality of data sets, the first device interoperability system determines a first subset of model parameters for an AI or ML model based on the first aggregated data set, the second device interoperability system determines a second subset of model parameters for the AI or ML model based on the second aggregated data set, the first device interoperability system transmits a first set of information based on the first subset of model parameters to the artificial intelligence analysis subsystem, the second device interoperability system transmits a second set of information based on the second subset of model parameters to the artificial intelligence analysis subsystem, the artificial intelligence analysis subsystem creates a set of model parameters associated with the AI or ML model based on the transmitted first and second sets of information, wherein:

the creation of the set of model parameters comprises the use of one or more aggregation techniques, the artificial intelligence analysis subsystem transmits the set of model parameters to the first and second device interoperability systems, and at least one of the first and second device interoperability systems deploy the AI or ML model based on the set of model parameters.

8. The method of claim 7, wherein the first and the second device interoperability systems are selected from the one or more device interoperability systems based on a set of criteria.

9. The method of claim 8, wherein the set of criteria comprises at least one of:

one or more availabilities related to the one or more interconnections to the artificial intelligence analysis subsystem;

one or more bandwidths related to the one or more interconnections to the artificial intelligence analysis subsystem;

one or more utilizations of the one or more device interoperability systems;

one or more processing capabilities available to the one or more device interoperability systems; and one or more availabilities of power to the one or more device interoperability systems.

10. The method of claim 7, wherein the determination of the first subset of model parameters comprises performing one or more model computations, wherein:

the one or more model computations comprises at least one computation related to one or more of training, testing, validation and cross-validation.

11. The method of claim 7, wherein at least one of the first plurality of devices or the second plurality of devices comprise one or more of:

an IoT device, and a smart device, wherein the smart device comprises at least one of:

a vehicle, a medical device, a kitchen appliance, an air-conditioning device, and a smart home device.

12. A method for privacy preserving artificial intelligence (AI) or machine learning (ML) comprising:

providing one or more device interoperability systems communicatively coupled to an artificial intelligence analysis subsystem via one or more interconnections, wherein the one or more device interoperability systems comprise:

a first device interoperability system communicatively coupled to a first plurality of user devices via a first plurality of connections, and a second device interoperability system communicatively coupled to a second plurality of user devices via a second plurality of connections;

receiving, at the first device interoperability system, a first plurality of data sets from the first plurality of user devices via the first plurality of connections;

receiving, at the second device interoperability system, a second plurality of data sets from the second plurality of user devices via the second plurality of connections;

creating, using the first device interoperability system, a first aggregated data set based on the received first plurality of data sets;

creating, using the second device interoperability system, a second aggregated data set based on the received second plurality of data sets;

determining, using the first device interoperability system, a first subset of model parameters for an AI or ML model based on the first aggregated data set, wherein:

the determining comprises performing one or more model computations, and at least some of the one or more model computations are performed by the first plurality of user devices;

determining, using the second device interoperability system, a second subset of model parameters for the AI or ML model based on the second aggregated data set;

transmitting, from the first device interoperability system, a first set of information created based on the first subset of model parameters to the artificial intelligence analysis subsystem;

transmitting, from the second device interoperability system, a second set of information created based on the second subset of model parameters to the artificial intelligence analysis subsystem;

creating, at the artificial intelligence analysis subsystem, a set of model parameters associated with the AI or ML model based on the transmitted first and second sets of information;

transmitting, from the artificial intelligence analysis subsystem, the set of model parameters to the first and second device interoperability systems; and deploying the AI or ML model at one or more of the first and second device interoperability systems based on the set of model parameters.

13. The method of claim 12, wherein one or more techniques are used to reduce the size of the first set of information prior to the transmitting.

14. The method of claim 13, wherein the one or more techniques comprise at least one of:

compression, structured updates, or sketched updates.

15. The method of claim 12, wherein the creating of the set of model parameters comprises using one or more aggregation techniques; and the one or more aggregation techniques comprise at least one of a federated averaging algorithm, and a secure aggregation algorithm.

16. The method of claim 12, further comprising encrypting the first set of information using homomorphic encryption prior to transmitting the first set of information.

17. The method of claim 12, wherein:

the first plurality of user devices comprises a first user device;

the first device interoperability system is located on the first user device; and the at least some of the one or more model computations are performed on one or more of the first plurality of user devices other than the first user device.

18. The method of claim 17, wherein the one or more of the first plurality of user devices other than the first user device are selected based on at least one of processing power and storage capacity.

19. The method of claim 17, wherein the first user device is one of a laptop, smartphone and a smart watch.

20. The method of claim 17, wherein the one or more of the first plurality of user devices other than the first user device comprises:

a desktop, a workstation, or a device associated with a vehicle.

* * * * *